(12) United States Patent
Triantaphyllou et al.

(10) Patent No.: US 8,725,663 B1
(45) Date of Patent: May 13, 2014

(54) SYSTEM, METHOD, AND COMPUTER PROGRAM PRODUCT FOR DATA MINING APPLICATIONS

(75) Inventors: Evangelos Triantaphyllou, Baton Rouge, LA (US); David Sathiaraj, Baton Rouge, LA (US)

(73) Assignee: Board of Supervisors of Louisiana State University and Agricultural and Mechanical College, Baton Rouge, LA (US)

(*) Notice: Subject to any disclaimer, the term of this patent is extended or adjusted under 35 U.S.C. 154(b) by 137 days.

(21) Appl. No.: 13/432,738

(22) Filed: Mar. 28, 2012
(Under 37 CFR 1.47)

(51) Int. Cl.
*G06F 15/18* (2006.01)
(52) U.S. Cl.
USPC .................................................. 706/12
(58) Field of Classification Search
USPC .................................................. 706/55
See application file for complete search history.

(56) References Cited

U.S. PATENT DOCUMENTS

| | | | | |
|---|---|---|---|---|
| 6,108,004 | A * | 8/2000 | Medl | 715/804 |
| 7,801,864 | B2 * | 9/2010 | Prahlad et al. | 707/667 |
| 2010/0082697 | A1 * | 4/2010 | Gupta et al. | 707/802 |

OTHER PUBLICATIONS

Mining of Massive Datasets Anand Rajaraman Jure Leskovec Stanford Univ. Jeffrey D. Ullman Stanford Univ.—Dec. 2010 https://web.archive.org/web/20090201000000*/http://infolab.stanford.edu/~ullman/mmds.html: http://infolab.stanford.edu/~ullman/mmds.html Saved 108 times between Dec. 16, 2010 and Dec. 7, 2013.*

U Fayyad, G Piatetsky-Shapiro, and P Smyth. "From data mining to knowledge discovery in databases." AI Magazine, 17(3):37-54, FAL 1996.
Bruce Lewis, Carmen Chan. "A basic primer on data mining." Information Systems Management, 19(4):56, 2002.
U Fayyad and R Uthurusamy. "Data mining and knowledge discovery in databases." Communications of the ACM, 39(11):24-26, Nov. 1996.
Alex Alves Freitas. "Understanding the crucial differences between classification and discovery of association rules—a position paper." SIGKDD Explorations, 2(1):65-69, 2000.
Edwin M. Knorr, Raymond T. Ng, and V. Tucakov. "Distance-based outliers: Algorithms and applications." VLDB J., 8 (3-4):237-253, 2000.
Stephen D. Bay and Mark Schwabacher. "Mining distance-based outliers in near linear time with randomization and a simple pruning rule." In Lise Getoor, Ted E. Senator, Pedro Domingos, and Christos Faloutsos, editors, KDD, pp. 29-38. ACM, 2003.
Ming-Syan Chen, Jiawei Han, and Philip S. Yu. "Data mining: An overview from a database perspective." IEEE Transactions on Knowledge and Data Engineering, 8(6):866-883, 1996.
Anna Koufakou and Michael Georgiopoulos. "A fast outlier detection strategy for distributed high-dimensional data sets with mixed attributes." Data Mining and Knowledge Discovery, 20(2, Sp. Iss. SI):259-289, Mar. 2010.

(Continued)

*Primary Examiner* — Kakali Chaki
*Assistant Examiner* — Ababacar Seck
(74) *Attorney, Agent, or Firm* — Raymond G. Areaux; J. Matthew Miller, III; Carver, Darden, Koretzky Tessier, Finn, Blossman & Areaux, LLC

(57) ABSTRACT

A system, method, and computer program product for evaluating a set of data records to identify critical records in said set which lie very close to a class boundary and are sensitive to small changes in attribute values, such that the small changes may result in the switching of classes. Additionally, a system, method, and computer program product is presented that uses said critical records to improve performance of a classifier.

60 Claims, 7 Drawing Sheets

(56) References Cited

OTHER PUBLICATIONS

R. Andrew Weekley, Robert K. Goodrich, and Larry B. Cornman. "An Algorithm for Classification and Outlier Detection of Time-Series Data." Journal of Atmospheric and Oceanic Technology, 27(1):94-107, Jan. 2010.

Mao Ye, Xue Li, and Maria E. Orlowska. "Projected outlier detection in high dimensional mixed-attributes data set." Expert Systems With Applications, 36(3, Part 2):7104-7113, Apr. 2009.

Kenneth McGarry. "A survey of interestingness measures for knowledge discovery." Knowledge Eng. Review, 20(1):39-61, 2005.

Liqiang Geng and Howard J. Hamilton. "Interestingness measures for data mining: A survey." ACM Comput. Surv., 38, Sep. 2006.

Tianyi Wu, Yuguo Chen, and Jiawei Han. "Re-examination of interestingness measures in pattern mining: a unified framework." Data Min. Knowl. Discov., 21(3):371-397, 2010.

Fabrizio Angiulli and Clara Pizzuti. "Outlier mining in large high-dimensional data sets." IEEE Trans. Knowl. Data Eng., 17(2):203-215, 2005.

Yufei Tao, Xiaokui Xiao, and Shuigeng Zhou. "Mining distance-based outliers from large databases in any metric space." In Tina Eliassi-Rad, Lyle H. Ungar, Mark Craven, and Dimitrios Gunopulos, editors, KDD, pp. 394-403. ACM, 2006.

Anna Koufakou, Jimmy Secretan, and Michael Georgiopoulos. "Non-derivable itemsets for fast outlier detection in large high-dimensional categorical data." Knowledge and Information Systems, 29(3):697-725, Dec. 2011.

Fabrizio Angiulli, Stefano Basta, and Clara Pizzuti. "Distance-based detection and prediction of outliers." IEEE Trans. Knowl. Data Eng., 18(2):145-160, 2006.

Amol Ghoting, Srinivasan Parthasarathy, and Matthew Eric Otey. "Fast mining of distance-based outliers in high-dimensional datasets." Data Min. Knowl. Discov., 16(3):349-364, 2008.

Varun Chandola, Arindam Banerjee, and Vipin Kumar. "Anomaly detection: A survey." ACM Comput. Surv., 41(3), 2009.

Markus M. Breunig, Hans-Peter Kriegel, Raymond T. Ng, and Jörg Sander. "Lof: identifying density-based local outliers." SIGMOD Rec., 29(2):93-104, 2000.

Lian Duan, Lida Xu, Ying Liu, and Jun Lee. "Cluster-based outlier detection." Annals of Operations Research, 168(1):151-168, Apr. 2009.

Rakesh Agrawal, Tomasz Imielinski, and Arun N. Swami. "Database mining: A performance perspective." IEEE Trans. Knowl. Data Eng., 5(6):914-925, 1993.

Niels Landwehr, Mark Hall, and Eibe Frank. "Logistic model trees." Machine Learning, 95(1-2):161-205, 2005.

D. J. Hand, C. Whitrow, N. M. Adams, P. Juszczak, and D. Weston. "Performance criteria for plastic card fraud detection tools." Journal of the Operational Research Society, 59(7):956-962, Jul. 2008.

J Demsar. "Statistical comparisons of classifiers over multiple data sets." Journal of Machine Learning Research, 7:1-30, Jan. 2006.

Joaqu'in Derrac, Salvador Garc'ia, Daniel Molina, and Francisco Herrera. "A practical tutorial on the use of nonparametric statistical tests as a methodology for comparing evolutionary and swarm intelligence algorithms." Swarm and Evolutionary Computation, 1(1):3-18, 2011.

Frank Wilcoxon. "Individual comparisons by ranking methods." Biometrics Bulletin, 1(6):80-83, 1945.

Navneet Panda, Edward Y. Chang, and Gang Wu. "Concept boundary detection for speeding up svms." In William W. Cohen and Andrew Moore, editors, ICML, vol. 148 of ACM International Conference Proceeding Series, pp. 681-688. ACM, 2006.

Pedro Domingos. "Metacost: A general method for making classifiers costsensitive." In Proceedings of the Fifth International Conference on Knowledge Discovery and Data Mining, pp. 155-164. ACM Press, 1999.

Mark Hall, Eibe Frank, Geoffrey Holmes, Bernhard Pfahringer, Peter Reutemann, and Ian H. Witten. "The WEKA data mining software: an update." SIGKDD Explorations, 11(1):10-18, 2009.

Kurt Hornik, Christian Buchta, and Achim Zeileis. "Open-source machine learning: R meets WEKA." Computational Statistics, 24(2):225-232, 2009.

D. Aha and D. Kibler. "Instance-based learning algorithms." Machine Learning, 6:37-66, 1991.

George H. John and Pat Langley. "Estimating continuous distributions in bayesian classifiers." In Eleventh Conference on Uncertainty in Artificial Intelligence, pp. 338-345, San Mateo, 1995. Morgan Kaufmann.

Max A. Little, Patrick E. McSharry, Eric J. Hunter, Jennifer L. Spielman, and Lorraine O. Ramig. "Suitability of dysphonia measurements for telemonitoring of parkinson's disease." IEEE Trans. Biomed. Engineering, 56(4):1015-1022, 2009.

Bianca Zadrozny, John Langford, and Naoki Abe. "Cost-sensitive learning by cost-proportionate example weighting." In ICDM, pp. 435-. IEEE Computer Society, 2003.

David E. Goldberg and John H. Holland. "Genetic algorithms and machine learning." Machine Learning, 3:95-99, 1988.

Parag Pendharkar and Sudhir Nanda. "A misclassification cost-minimizing evolutionary-neural classification approach." Naval Research Logistics, 53(5):432-447, Aug. 2006.

Goecks, J. and D. Cosley, "NuggetMine: Intelligent Groupware for Opportunistically Sharing Information Nuggets," In Proceedings of IUI 2002, the 7th International Conference on Intelligent User Interfaces, ISBN:1-58113-459-2 ACM, New York, NY, pp. 87-94, 2002.

Clarke, C.L.A., M. Kolla, G.V. Cormack, O. Vechtomova, A. Ashkan, S. Büttcher, and I. MacKinnon, "Novelty and Diversity in Information Retrieval Evaluation," in the Proceedings of the 31st ACM SIGIR Conference, pp. 659-666, Jul. 20-24, 2008.

Wesley Hildebrandt, Boris Katz, and Jimmy Lin, "Answering Definition Questions Using Multiple Knowledge Sources," in Proceedings of HLT/NAACL, 2004.

Inmon, W.H., "The Data Warehouse and Data Mining," Comm. of the ACM, vol. 39, No. 11, pp. 49-50, Nov. 1996.

Pousman, Z. and J. Stasko, "A taxonomy of ambient information systems: four patterns of design," in Proceedings of AVI 2006, Working Conference on Advanced Visual Interfaces, ISBN:1-59593-353-0, ACM, New York, NY, pp. 67-74, 2006.

\* cited by examiner

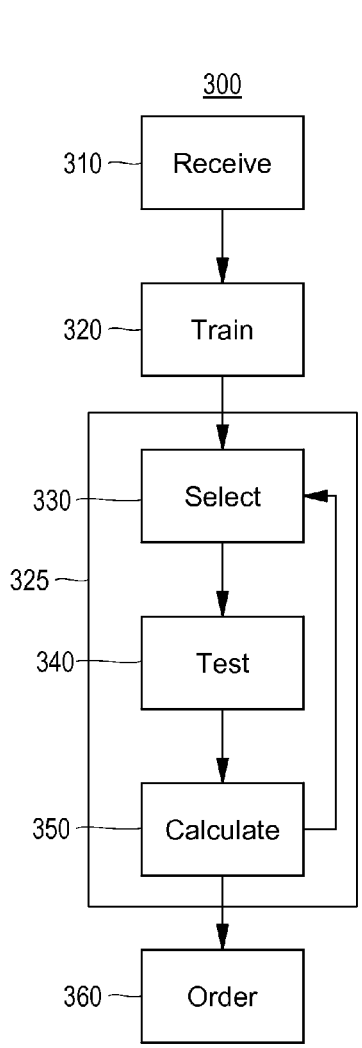
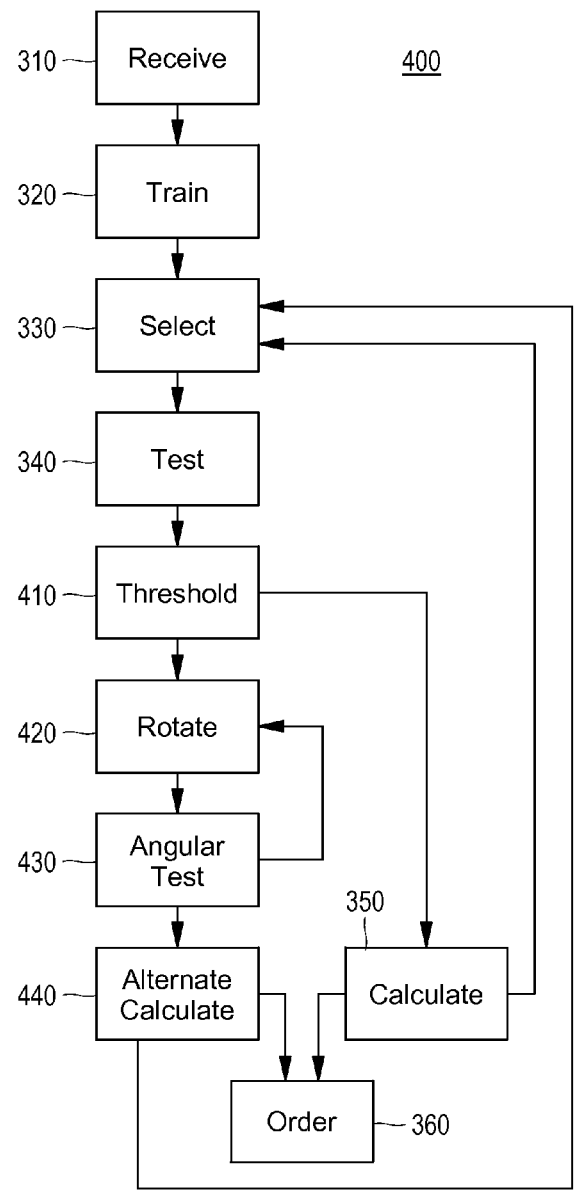
FIG. 3
FIG. 4

SYSTEM, METHOD, AND COMPUTER PROGRAM PRODUCT FOR DATA MINING APPLICATIONS

BACKGROUND OF THE INVENTION

I. Field of the Invention

The present invention relates generally to techniques for analysis of data using computer methods, specifically to systems and methods for data mining and identification of critical elements within a larger data set.

II. General Background

Existing classification and data mining techniques seek to classify data records as being part of groups, or classes. However, in our view, existing techniques perform poorly when examining data records that are near the boundary separating two classes. It is also our view that other existing data mining methods, such as outlier detection methods, focus on data records having attribute values far from expected normal values, but not on data records that lie close to a class boundary. Additionally, in our view, existing techniques are unable to identify data records where small changes in data values could have profound impacts, changing the ultimate classification.

In view of the foregoing, there is, in our view, a continuing need for a method, apparatus, and computer program product for identifying critical data records and attributes thereof within a data set and for improvements in existing classification techniques.

SUMMARY OF THE INVENTION

According to exemplary embodiments, a method for identifying critical data records and attributes within a data set is provided. Furthermore, a method for using said identified critical data records and attributes for improving existing classification techniques is also provided.

An apparatus and a computer program product corresponding to the above-summarized method are also described.

Additional features and advantages are realized through the techniques of the present invention. Other embodiments and aspects of the invention are described in detail herein and are considered a part of the invention. For a better understanding of the invention with advantages and features, refer to the description and the drawings.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein:

FIG. 3 is a flow chart depicting a method for identifying critical neighborhoods.

FIG. 4 is a flow chart depicting an alternate method for identifying critical neighborhoods.

DETAILED DESCRIPTION OF THE INVENTION

Figure 1:
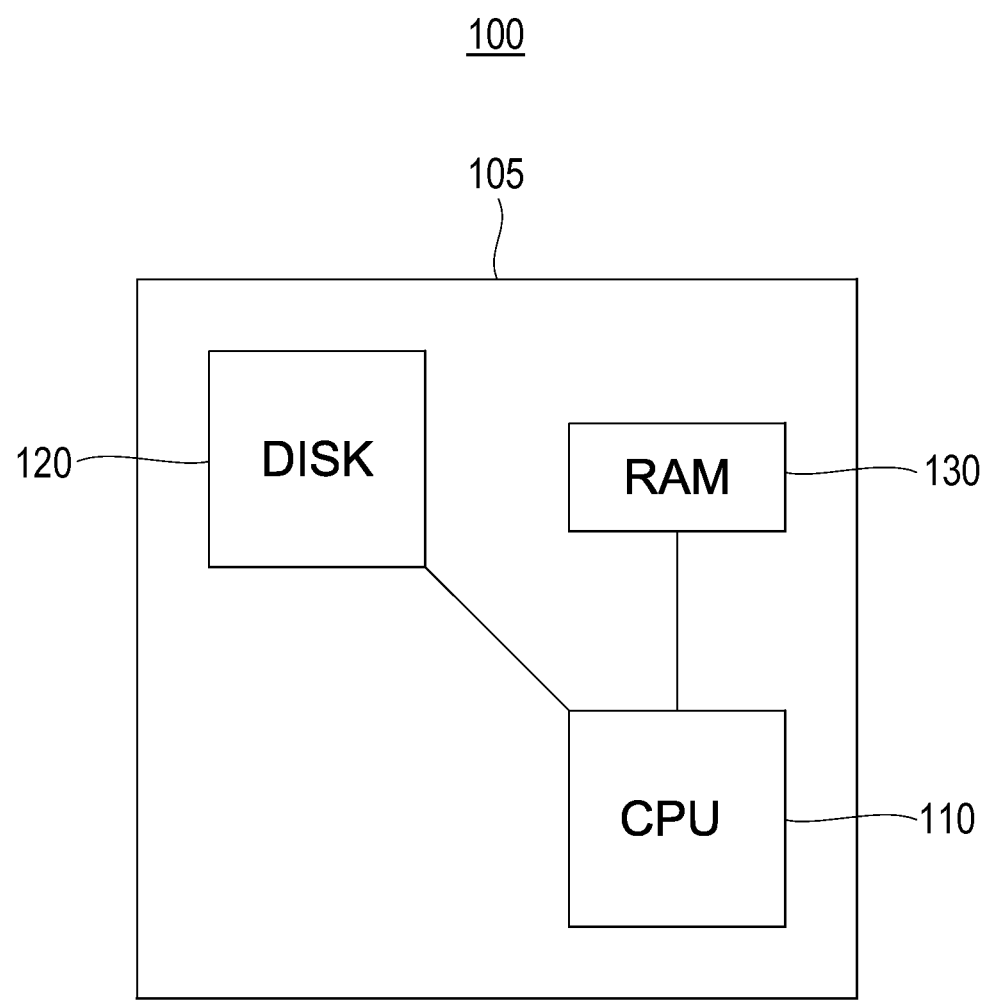
FIG. 1 is a block diagram depicting a computer system for data analysis.

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations. Thus, the following more detailed description of the embodiments of the system and method of the disclosure, as represented in FIGS. 1-9 is not intended to limit the scope of the disclosure, as claimed, but is merely representative of possible embodiments of the disclosure.

Each computer of a network may include a processor such as a microprocessor, microcontroller, logic circuitry or the like. The processor may include a special purpose processing device such as an ASIC, PAL, PLA, PLD, Field Programmable Gate Array, or other customized programmable device. The computer may also include a memory such as non-volatile memory, static RAM, dynamic RAM, ROM, CD-ROM, disk, tape, magnetic, optical, flash memory, or other computer storage medium (which memory can store computer software). It is understood that the computer may run software that is stored in such a computer readable medium. The computer may also include various input devices and/or output devices. The input device(s) may include a keyboard, mouse, touch screen, light pen, tablet, microphone, sensor, or other input hardware with accompanying firmware and/or software. The output device(s) may include a printer, monitor, speakers, or other output hardware with accompanying firmware and/or software.

Aspects of certain of the embodiments described are illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., which performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools including, but not limited to, XML, Java, Python, PHP, Pascal, C++, C, R, Weka, Redis, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

The term "distance" as used herein and in the claims means, at least, Euclidian distance in n-space. For 5-space, the Euclidian distance between point $[v_1, w_1, x_1, y_1, z_1]$ and point $[v_2, w_2, x_2, y_2, z_2]$ is equal to $\sqrt{(v_1-v_2)^2+(w_1-w_2)^2+(x_1-x_2)^2+(y_1-y_2)^2+(z_1-z_2)^2}+$. The formula for Euclidian distance in n-space for any value of n may be extrapolated by one skilled in the art according to standard mathematics principles. However, other distance metrics can be used. For example, Bregman divergence (including, without limitation, the Mahalanobis distance formula) may be used. Additionally, non-Euclidian geometries, and their respective distance formulae, may be used (i.e., using elliptic and hyperbolic geometry). Additionally, numeric distance may be calculated using formulae derived to compare alphanumeric strings (including, without limitation, the Levenshtein distance formula).

1. Introduction

In recent times, detecting patterns and outliers has emerged as an important area of work in the field of data mining. It is our view that detecting patterns and outliers has several applications including, without limitation, detecting fraud in business transactional data, identifying network intrusions, isolating abnormal trends in time-series data, identifying abnormal health conditions, and picking out suspicious criminal activity. The invention described and claimed herein may be applied to these and other fields of research. A good definition of an outlier is that, "an outlier is an observation that deviates so much from other observations as to arouse suspicions that it was caused by a different mechanism." D. Hawkins, *Identification of Outliers* (*Monographs on Statistics and Applied Probability*). Springer, 1980. The concept of distance-based outliers has been proposed by others to identify records that are different from the rest of the data set. Distance based measures have been used in algorithms to delineate outliers or abnormal records from normal records. A large volume of work in the field of data mining has also been directed towards finding interesting patterns or rules present in data sets. However, in our view, a relatively smaller volume of work has focused on finding what we call "critical nuggets" (also referred to herein as "critical neighborhoods") of information that may be hidden in data sets. The term "nuggets" is a term of art, but, in our view, has never been quantified. Our disclosed invention provides a new metric for measuring groups (nuggets or neighborhoods) of data records, and, therefore, quantifies the term "nugget" in a novel fashion. Additionally, these critical nuggets (neighborhoods) of information may not always be detectable by distance-based outlier detection methods, as critical nuggets may not be comprised of outliers. One example is the classification of tumors where laboratory results place the tumor very close to the border between being benign and malignant. Put another way, a slight change in one result of a battery of tests could change the resulting diagnosis from benign to malignant, or from malignant to benign. Such data records, if they were to exist in a data set, would not 'deviate so much' from both benign and malignant observations, but instead would lie extremely close to the class boundary separating the benign and malignant classes. Moreover, in our view, such data records may not necessarily contain sufficient deviation to be captured by distance-based outlier detection methods.

There are numerous other examples. For example, in tight elections, the undecided voters are crucial in deciding the outcome. The problem of identifying the undecided voters and the attributes that can tilt them to the opposite side is valuable information. Another example is to predict cases from bank loan data that are very close to bankruptcy. In this setting, the important task is to identify cases before they become bankrupt. In many applications the problem is not of finding individual outliers, but instead, of finding critical nuggets (subsets of data) that provide valuable information which in turn can be used for improved classification results and a better understanding of false positive and false negative errors.

One aspect of our disclosed invention is to identify subsets of critical data instances in data sets. Critical nuggets of information can take the form of data instances that lie very close to the class boundary and are sensitive to small changes in attribute values, such that these small changes result in the switching of classes. In our view, such critical nuggets have an intrinsic worth to classification tasks that far outweighs other subsets of the same data set. For example, given a data set that conforms to a certain representation or a classification model, if a few data instances are altered by making small changes to some of their attribute values, the original classification model representing the data set changes. Furthermore, given the same data set with those data instances removed, the original model could change significantly. The magnitude of changes to the original classification model provides clues to the criticality of such data instances, as more critical data instances tend to impact the classification model more significantly than data instances that are comparatively non-critical.

The method of this invention uses a metric ($UC_{score}$, where UC stands for ultra-critical) to measure the criticality of subsets in a data set. The $UC_{score}$ provides for a rank ordering of critical nuggets. Only the subsets that have a high $UC_{score}$ are considered as critical nuggets. An algorithm is proposed to discover critical nuggets using the proposed $UC_{score}$. In use with data available from the UCI machine learning repository (available at, http://archive.ics.uci.edu/ml/) (hereby incorporated by reference), the methodology of our disclosed invention reveals a relatively small number of data subsets having a $UC_{score}$ significantly higher than the rest of the subsets. It is these subsets that can be characterized, in our view, as true critical nuggets and, accordingly, in our view should be considered in classification improvement techniques.

2. Related Work and Problem Motivation

Critical nuggets in certain cases may involve outliers, but this may not always be true. For example, cells in tumors may not show anomalous behavior on an individual basis but collectively, such cells may contain critical pieces of information. It is our view that the state of the industry holds the following view: that performance of a distance-based outlier detection method greatly relies on a distance measure, defined between a pair of data instances which can effectively distinguish between normal and anomalous instances. There are two benefits to our currently disclosed method over such view of the industry. First, defining distance measures between instances can be challenging when the data is complex. Second, critical nuggets that belong to a data set may not be at a great 'distance' from the other 'normal' points, and may end up being classified as 'normal.' In the field of distance-based outlier detection, it is our view that researchers have focused on proposing algorithms that reduce the time complexity $O(n^2)$ of calculating distances. Another technique not part of our disclosed invention is density-based outlier detection, where outliers are defined as objects that show anomalous trends with respect to their local neighborhoods and tend to lie in a less dense area with respect to a more dense local neighborhood. M. M. Breunig, H.-P. Kriegel, R. T. Ng, and J. Sander, "L of: identifying density-based local outliers," *SIGMOD Rec.*, vol. 29, no. 2, pp. 93-104, 2000 (hereby incorporated by reference). The concept of density-based detection has been extended by others to cluster-based outlier detection where the approach does not only find single point outliers but instead clusters of outliers. L. Duan, L. Xu, Y. Liu, and J. Lee, "Cluster-based outlier detection," *Annals of Operations Research*, vol. 168, no. 1, pp. 151-168, April 2009 (hereby incorporated by reference). However, in our view, cluster-based outlier detection suffers from the same problems as other techniques based on outlier detection—such techniques may not necessarily lead to discovery of critical nuggets and the areas detected may not carry information that is critically important to the data domain.

Our disclosed invention generally defines a "criticality property," as the intrinsic worth of a subset of records, where such worth is realized when the records are collectively removed from the data set or their attribute values undergo perturbation. This property is guided by two principles.

First, Points Near the Boundary, in General, are Critical.

It is our view that the deciding factor for most classification algorithms is how accurately the algorithm classifies the points near the class boundaries. Thus, in our view, the points that are far from the class boundaries may be classified with less difficulty. It is also our view that the impact of misclassification of points far from the class boundaries is pretty minimal. However, in our view, the points near the class boundaries are more susceptible to misclassification. These points are in our view critical in analyzing the accuracy of any classification algorithm. Our understanding of the importance of the idea that points near classification boundaries are critical can best be explained by the real world example of a data set describing cancer diagnoses. It is our view that most classification algorithms can easily classify a full-blown cancer case or a clearly cancer-free case. On the other hand, we view the border-line cases, which may exhibit subtle symptoms of cancer, as critical, because early detection can save a life. Hence, discovery of uncertain regions in and around the class boundaries can be crucial for identifying important data subsets, subsets which we have designated as "critical nuggets."

Second, Boundary Features can be Critical.

As a corollary to our first idea—that points near a boundary can be critical—is the idea that there are certain regions along the boundary where the problem of classification becomes more difficult. We explain this using a geographical data set that corresponds to a political boundary. Classifying records near sharply changing outlines (such as along a complex sea coast of a political boundary) is more difficult than straight edges of the boundary. We speculate that for more complex data sets, there may be certain inherent complex properties that render the points near the boundary difficult to classify. Such regions, we speculate, have a higher potential for harboring critical nuggets.

In summary, our disclosed invention may search for critical nuggets in an area narrowed to a region near a boundary separating a preclassified set of data. Furthermore, in our disclosed invention the criticality score of a subset of data (also known as a criticality metric or the $UC_{score}$) has been defined in such a way that it yields higher scores for sets of data records that lie near complex boundary features. In other words, a property of our disclosed invention is that because, in our view, misclassification using traditional techniques is higher where a boundary feature is more complex, data sets including points near those areas will have higher criticality scores.

3. Problem Description 3.1 Formula Notation

Consider a training data set $T_r$ comprised of m data instances, n attributes and two classes, denoted as positive ('+') and negative ('−') (it is our view that these names are arbitrary). Consider also a sample neighborhood N to be a subset of $T_r$, comprised of d data instances (i.e., number of rows in N) of the data set $T_r$.

Besides the above notation, the following notation will also be used:

C—any classification algorithm.

$T_r^+$—the subset of $T_r$ comprised of only the '+' class.

$T_r^-$—the subset of $T_r$ comprised of only the '−' class.

A—the set of attributes in $T_r$ denoted as $\{A_1, A_2, A_3, \ldots, A_n\}$

D—the set of the data instances in $T_r$ denoted as $\{D_1, D_2, D_3, \ldots, D_m\}$ $d_j^+$—the number of instances in N that switch classes when attribute $A_j$ is increased by $\delta_j$.

$d_j^-$—the number of instances in N that switch classes when attribute $A_j$ is decreased by $\delta_j$.

$N[A_1{:}A_j]$—column vector of size d×1, formed by choosing only attribute $A_j$ from matrix (neighborhood) N.

$N[A_1{:}A_j]$—matrix of size d×j, formed by choosing attributes $A_1$ through $A_j$.

$N_1 \cdot N_2$—appending two matrices, column-wise (e.g., if $N_1$ and $N_2$ were each of size 2×3, the combined matrix would be of size 2×6).

$M_0$—the model obtained by using classification algorithm C on training set $T_r$.

$P_0$—the vector of predicted class values by model $M_0$ when applying $M_0$ on a neighborhood of instances, N.

$B^+$—the set of '+' points near the boundary separating the two classes, '+' and '−'.

$B^-$—the set of '−' points near the boundary separating the two classes, '+' and '−'.

$\overline{B^+}$—the set of '+' points not near the boundary separating the two classes, '+' and '−'.

$\overline{B^-}$—the set of '−' points not near the boundary separating the two classes, '+' and '−'.

From the above definitions, it follows that: $|T_r^+|=|B^+|+|\overline{B^+}|$, $|T_r^-|=|B^-|+|\overline{B^-}|$, and $|T_r|=|T_r^+|+|T_r^-|$, where $|X|$ denotes the cardinality of set X.

3.2 Definition of Criticality

Our initial steps in defining the critical metric ($UC_{score}$) relied on the effect of removing a neighborhood of data instances on a classification model. A classification model $M_0$ was initially derived by applying a classification algorithm C on the training data $T_r$. Then a neighborhood of data instances, N, were removed from $T_r$, and a new classification model $M_1$ was obtained by applying C on the set comprised of $T_r$ but not including N. The difference in predictions made by $M_0$ and $M_1$, divided by the number of data instances in N, was initially used as the criticality measure, $UC_{score}$. The greater the difference in predictions between $M_0$ and $M_1$, the higher the $UC_{score}$ was and vice versa. Although we validated this technique on some two-dimensional data sets, in our view, this metric could not isolate all the areas that should be considered critical, even though this task is trivial to the human observer. Therefore, we devised a different approach to deriving the $UC_{score}$ that comprises part of our disclosed invention.

Consider a training data set $T_r$ with m data instances, each instance having n attributes denoted as $A_j$ ($j \in \{1, 2, \ldots, n\}$). The underlying assumption is that all attributes are numeric and not categorical. From $T_r$, choose a data instance $D_i$ and a group of points that belong to the same class as $D_i$ and lie within a distance R from $D_i$ (essentially, choosing a neighborhood N comprised of d data instances that belong to the same class and all d instances lying within a distance R from $D_i$). First, a classification model $M_0$ is generated by applying a classification algorithm C to the training data set $T_r$. The classification model $M_0$, can predict class labels for the different data instances in question.

For d instances in neighborhood N, consider an attribute $A_j$. Also, for the d instances, attribute $A_j$ can be increased or decreased in magnitude. A parameter denoted by $\delta_j$ is used for this and $\delta_j$ varies for different attributes in neighborhood N. After increasing $A_j$ by an extent $\delta_j$ for just the d instances, the classification model $M_0$ for the new class labels for the d instances is queried. The average number of data instances that have switched classes in neighborhood N is computed and is denoted as $w_j^+$. If all the data instances in N switch classes, then our disclosed invention recognizes and infers that N is very sensitive to changes with respect to attribute $A_j$. The same test is applied on all data instances in N by decreasing each data instance's respective $A_j$ by the same extent $\delta_j$, thus finding w by querying the classification model $M_0$ for the new class labels. For attribute $A_j$, the average of $w_j^+$ and $w_j^-$ is computed to get $w_j$. Repeating this process for all n attributes, the average of $w_j$ scores is computed as the $UC_{score}$ for neighborhood N. Formally, the critical score is defined as $$UC_{score} = \frac{\sum_{j=1}^{n}(w_j)}{n}$$

where: $w_j = \frac{w_j^+ + w_j^-}{2}$, $w_j^+ = \frac{d_j^+}{d}$ and $w_j^- = \frac{d_j^-}{d}$

3.3 Properties of the Critical Score

Based on the score developed above, the following properties are outlined:

Each $w_j$ value lies in the interval [0,1]. Each $w_j$ value is calculated by averaging $w_j^+$ and $w_j^-$.

Also, $w_j^+ \in [0,1]$, and $w_j^- \in [0,1]$. Hence, $w_j \in [0, 1]$.

$UC_{score} \in [0,1]$, as there are n instances of $w_j$ and $UC_{score}$ is averaged over n.

In calculating the critical score, an aspect of our disclosed invention is to find as many attributes in a respective data subset that are sensitive to small changes (such as the increase and decrease of $A_j$ by $\delta_j$) such that an entire subset is propelled from one class to another. A property of the method of calculating $UC_{score}$ is that a subset with a higher $UC_{score}$ will be more likely to have a greater number of attributes that are sensitive to such changes.

A neighborhood of data instances $N_1$ is said to be more critical than a neighborhood $N_2$, if and only if $UC_{score}(N_1) > UC_{score}(N_2)$.

3.4 Calculating $UC_{score}$

The GetNuggetScore algorithm is used to calculate the $UC_{score}$. The GetNuggetScore algorithm is defined in Table 1.

TABLE 1

GetNuggetScore Algorithm

Require: $T_r$: the training set, N: a neighborhood of data instances and R: a distance parameter used in creating the neighborhood set, N
1:    $M_0$ = Model resulting from training C using training set, $T_r$.
2:    m = number of data instances in $T_r$.
3:    n = number of attributes in $T_r$.
4:    *ScoresArray* = ∅
5:    for each j in $\{1,2,...,n\}$ do
6:       $\delta_j = \max(A_j) - \min(A_j)$
7:       if $\delta_j = 0$ then
8:          $\delta_j = R$
9:       end if
10:      $V = N[A_j] + \delta_j$ {Extract $A_j$, increment all values in column $A_j$ by $\delta_j$}
11:      $N_1 = N[1:A_{j-1}].V.N[A_{j+1}:A_n]$ {Generate new matrix, keep previous columns and replace $A_j$ by V instead}
12:      $P_0$ = Query $M_0$ to obtain new class labels for $N_1$
13:      $w_j^+$ = Average number of instances in $P_0$ that have switched classes
14:      $V = N[A_j] - \delta_j$ {Decrement all values in column $A_j$ by $\delta_j$}
15:      $N_2 = N[1:A_{j-1}].V.N[A_{j+1}:A_n]$
16:      $P_0$ = Query $M_0$ to obtain new class labels for $N_2$
17:      $w_j^-$ = Average number of instances in $P_0$ that have switched classes
18:      threshold=1
19:      if $w_j^+ \geq$ *threshold* then
20:         *up_counter* = 1
21:      else
22:         *up_counter* = 0
23:      end if
24:      if $w_j^- \geq$ *threshold* then
25:         *down_counter* = 1
26:      else
27:         *down_counter* = 0
28:      end if
29:      *sum_score* = $w_j^+ + w_j^-$
30:      if (*up_counter* ⊕ *down_counter*) = True then
31:         *sum_score*=RotationTest($M_0$,N,$A_j$)
32:      end if
33:      $w_j$ = (*sum_score*)/2
34:      Append $w_j$ to *ScoresArray*
35:    end for
36:    $$UC_{score} = \frac{\sum(ScoresArray)}{n}$$
37:    return $UC_{score}$ The GetNuggetScore algorithm uses the parameter, $\delta_j$. This parameter is a measure of how much the attribute values increase or decrease when perturbing data points in a set in the process of calculating the $UC_{score}$. For each attribute $A_j$, an appropriate value of $\delta_j$ is calculated by analyzing the range of values of $A_j$ in neighborhood N. It is our understanding that our invention works better when an appropriate value of $\delta_j$ is used, such that perturbing attribute values $A_j$ (by increasing and decreasing $A_j$ by $\delta_j$) causes many change-sensitive data records to switch class labels without causing other data records to switch class labels. In other words, we understand that if $\delta_j$ is too big, many non-change-sensitive data records will switch class labels, and if $\delta_j$ is too small, very few data records will switch class labels.

One problem encountered is that where only one attribute value is changed by $\delta_j$ at a time, the relative orientation of axes and the location of the class boundary can influence the result. Put another way, where two areas are equally critical, relative orientation can cause the $UC_{score}$ of each area to be different.

Our disclosed invention solves this problem by rotating one attribute with respect to another attribute. Our disclosed invention can calculate $UC_{score}$ using a sequence of rotations by angle θ until a complete rotation of 360° is achieved. The summation of weights, $w_j^+$ and $w_j^+$ are recorded at each step. At the end of this iteration, the maximum value of the sum of weights, $w_j^+$ and $w_j^-$ is returned and recorded in memory for each attribute being considered. The final $UC_{score}$ value for a given subset is the average of all the previously recorded maximum $w_j^+$ and $w_j^-$ values for each attribute, after all the attributes have been considered.

This approach is incorporated into the GetNuggetScore algorithm in the algorithm's use of the RotationTest function. The GetNuggetScore algorithm includes a call to the RotationTest function, outlined as Table 2, which attempts to resolve the above discussed problem of two similarly-critical areas each receiving a different or non-representative $UC_{score}$.

Our disclosed invention uses a threshold parameter to test what percentage of instances in a neighborhood switches class labels when a certain attribute value is increased or decreased. If all the instances end up switching class labels during either increasing or decreasing an attribute's values, then the RotationTest function need not be invoked since the non-representative scores result only during partial switching of class labels. Similarly, if none of the instances switch class labels where attributes are changed along both directions, there is also no necessity to invoke the RotationTest function. However, if all the instances end up switching class labels along one direction and a partial switching of labels occurs in the opposite direction, then our disclosed invention uses the threshold parameter to decide whether to invoke the RotationTest function.

We understand that invocation of the RotationTest function is a trade-off between computation time and potentially decreased inaccuracies. If a user of our disclosed invention seeks to minimize the number of calls to the RotationTest function, then the threshold parameter can be set as high as 1, in order to bypass the test and therefore reduce the computation time. However, if the need is to ensure that all critical nuggets are mined out without any conflict, then one can lower the threshold. We speculate that such values are between 0.5 and 1. Additionally, it is our understanding that a threshold value of less than 0.5 does not yield additional critical nuggets, as this corresponds to a situation where the attribute in question is not switching labels when shifted in both directions.

The key idea in the RotationTest is summarized as follows: for each attribute $A_j$, rotate the values corresponding to $A_j$ by an angle θ with respect to another attribute $A_k$ (j≠k). For each of the different angles considered and the different attributes $A_j$, the sum of weights, $w_j^+$ and $w_j^-$ is computed and recorded. After all the angles have been considered, the maximum value among the recorded sum of weights $w_j^+ + w_j^-$ is chosen. The RotationTest function is detailed in Table 2, below:

TABLE 2

The RotationTest Method

Require: $M_0$ : Model, N: a neighborhood of data instances, $A_j$: an attribute and R: a distance parameter used in creating the neighborhood set, N
1:    Array = φ
2:    for each θ in {10, 20, ..., 360} do
3:      TempArray = ø
4:      $\delta_j$ = max($A_j$) − min($A_j$)
5:      if $\delta_j$ =0 then TABLE 2-continued The RotationTest Method 6:        $\delta_j$ = R
7:      end if
8:      for each k in {1, 2 ..., m} and k != j do
9:        $\delta_x = \delta_j * \cos((\pi/180) \times \theta)$
10:       $\delta_y = \delta_j * \sin((\pi/180) \times \theta)$
11:       $V_j = N[A_j] + \delta_x$
12:       $V_k = N[A_k] \delta_y$
13:       if j < k then
14:         $N_1 = N[1 : A_{j-1}].V_j.N[A_{j+1} : A_{k-1}].V_k.N[A_{k+1} : A_n]$
15:       else
16:         $N_1 = N[1 : A_{k-1}].V_k.N[A_{k+1} : A_{j-1}].V_j.N[A_{j+1} : A_n]$
17:       end if
18:       $P_0$ = Query $M_0$ to obtain new class labels for $N_1$
19:       $w_j^+$= Average number of instances in $P_0$ that have switched classes
20:       $V_j = N[A_j] − \delta_x$
21:       $V_k = N[A_k] − \delta_y$
22:       if j < k then
23:         $N_2 = N[1 : A_{j-1}].V_j . N[A_{j+1} : A_{k-1}].V_k.N[A_{k+1} : A_n]$
24:       else
25:         $N_2 = N[1: A_{k-1}].V_k . N[A_{k+1} : A_{j-1}].V_j .N[A_{j+1} : A_n]$
26:       end if
27:       $P_0$ = Query $M_0$ to obtain new class labels for $N_2$
28:       $w_j^-$ = Average number of instances in $P_0$ that have switched classes
29:       Append ($w_j^+ + w_j^-$) to TempArray
30:      end for
31:      Append max(TempArray) to Array
        {i.e., find the max score among the k attributes}
32:    end for
33:    return max(Array)

3.5 Searching Near the Class Boundary

One aspect of our disclosed invention is to find critical nuggets in $T_r$ using a so-called brute-force method. An additional aspect of our disclosed invention is to find critical nuggets in $T_r$ by performing analysis on only some of the data records in a set.

Practicing our disclosed invention in a brute-force method is to exhaustively examine all possible subsets, calculate their $UC_{score}$ values, and choose the critical nuggets based on the ordering of said $UC_{score}$ values. However, for a large data set, this would be computationally cumbersome due to the combinatorial explosion of the problem. It is an aspect of our disclosed invention to examine data sets near the class boundary that separates the classes of the training set. We speculate that points near the class boundary are more susceptible to switching of classes when perturbed (i.e., an attribute is adjusted by $\delta_j$) as according to our disclosed invention. When certain attribute values of boundary points are perturbed, the chances of a boundary point switching to the opposite class are higher than a point not near the boundary (e.g., deep in the interior). As used herein, the terms "boundary points" and "points near the boundary" mean the data records in a set of data records that lie near a boundary separating the two classes.

Our disclosed invention is operable with any number of boundary detection algorithms known in the art. Boundary detection algorithms help in identifying data records that lie close to a boundary separating classes of a data set and help to reduce a large data set to a smaller subset of data records for further analysis. Some examples of boundary detection algorithms are described in the following articles: (1) "The K-Farthest-Neighbors-Based Concept Boundary Determination for Support Vector Data Description" by Xiao et. al published in CIKM 2010, Proceedings of the 19th ACM international conference on Information and Knowledge Management (hereby incorporated by reference); and (2) "Concept Boundary Detection for speeding up SVMs" by Panda et. al., published in ICML 2006, Proceedings of the 23rd international conference on Machine Learning (hereby incorporated by reference). These methods mainly were designed to speed up the performance of support vector machines, one classification methodology and will work with our disclosed invention. In an exemplary embodiment of our disclosed invention, a boundary detection algorithm is used to limit the search space for detection of critical nuggets. This exemplary embodiment uses Euclidean distances to rank the distances between points. The algorithm, which we call FindBoundary, is outlined in Table 3. Other distance metrics, including without limitation, those discussed herein, may be used with the boundary detection algorithm of this exemplary embodiment.

TABLE 3

The FindBoundary algorithm

Require: $T_r^+$ and $T_r^-$ : The training sets for classes '+' and '−'
1:  Initialize array S = φ
2:  for each point i in $T_r^+$ do
3:    Calculate distance to all points in $T_r^-$
4:    Find the nearest k $T_r^-$ points to i (in an exemplary embodiment, k may be 5)
5:    Normalize the above top k distances by averaging the k values to get a score $S_i$
6:    Store each $S_i$ score in list S
7:  end for
8:  Sort all the scores in the list S
9:  Plot a graph of sorted scores in S.
10: Find cut-off index i where the slope of the graph starts increasing drastically. {Points near the boundary will have smaller scores and as one moves away from the boundary, the scores start increasing drastically}
11: Points corresponding to scores $S_1, S_2, \ldots S_i$ in list S form the boundary set $B^+$.
12: return Boundary Set $B^+$.
13: Repeat algorithm with $T_r^-$ in the role of $T_r^+$ to get Boundary Set B− .

This aspect of our disclosed invention is operable with embodiments of our disclosed invention which are in turn operable with two-class data seta. Accordingly, this aspect of our disclosed invention operates in two phases. In each phase, a boundary set is isolated for each class in the data set. So, for isolating the boundary points for the positive ('+') class, the algorithm works by calculating distances to all points in $T_r^-$ from each point in $T_r^+$. For every point in $T_r^+$, k closest $T_r^-$ points are chosen and the average of the k distances is calculated. The $T_r^+$ points that have the k smallest average distances are the ones that are considered to be closest to the boundary. This procedure is then carried out again for isolating boundary points for the negative ('−') class.

3.7 The FindCriticalNuggets Algorithm

The FindCriticalNuggets algorithm of our disclosed invention works in two phases. In each phase, the algorithm identifies critical nuggets for each one of the two classes (two classes are assumed for our disclosed invention). Using the reduced boundary set for each class, the FindCriticalNuggets algorithm considers data instances in the boundary set one at a time. Each data instance in the boundary set is considered as a center point for a neighborhood. A neighborhood is formed by finding all points that belong to the same class and lie within a distance R from said center point. One class at a time is considered (because the goal of the FindCriticalNuggets algorithm is to find critical nuggets that belong to one class but switch to the other class when their attribute values are perturbed). If there are |B+| data instances in the boundary set which belong to the same class, the FindCriticalNuggets algorithm forms |B+| neighborhoods by considering each instance in B+ as a center. For each of the |B+| neighborhoods, the $UC_{score}$ is computed according to the method described herein. The scores are then ranked and the higher scores are used to identify the critical nuggets in $T_r^+$. In the second phase, the same operation is performed on data instances belonging to the other class. Just as with the |B+| neighborhoods, |B−| neighborhoods are used to compute the $UC_{score}$ values, which in turn are sorted and ranked to identify critical nuggets in $T_r^-$. In one exemplary embodiment, critical nuggets are separated from noncritical nuggets by creating a histogram of criticality scores and identifying a distribution (e.g., a bimodal distribution) of the data points or identifying a noticeable degradation in frequency of criticality score. We view this process as similar to that of assigning grades on a curve. In our view, very few neighborhoods have high $UC_{score}$ values, and, in certain applications, the neighborhoods having approximately the top 20 highest $UC_{score}$ values are identified as critical. The FindCriticalNuggets algorithm is detailed in Table 4, below.

TABLE 4

FindCriticalNuggets algorithm

Require: $T_r$: the training set; and R: the distance parameter to form the neighborhood set N
1:  ScoresArray= φ
2:  Split $T_r$ into $T_r^+$ and $T_r^-$
3:  $B^+$ = FindBoundary($T_r^+$)
4:  for each $p_0$ in $B^+$ do
5:    N = {x | x ∈ $B^+$ ∧ |x − $p_0$| ≤ R } {Finding same class points, within a distance R from $p_0$}
6:    $UC_{score}$ =GetNuggetScoreRevised($T_r$, N, R)
7:    Append $UC_{score}$ to ScoresArray
8:  end for
9:  Sort (descending) and rank scores in ScoresArray
10: Plot sorted scores in ScoresArray as a histogram and use the histogram to find index k that separates the highest k scores from the rest of the scores.
11: Use k to find the top k Critical Nuggets for class '+'.
12: Re-initialize ScoresArray and repeat steps 2-11 with B− in the role of $B^+$, to find critical nuggets for class '−'.

In summary, the process of finding critical nuggets according to our disclosed invention first involves the identification of an approximate boundary set, considers a neighborhood around each boundary point in said approximate boundary set, and calculates the $UC_{score}$ for each said neighborhood.

3.8 Choosing R

The FindCriticalNuggets algorithm of our disclosed invention uses a distance parameter R to define neighborhoods. Choosing R is an important decision in identifying critical nuggets. Choosing a too small R value may yield single element critical nuggets (subsets) while choosing a too large value of R will yield large sized neighborhoods that may not be sensitive to small changes in their attribute values. Also, choosing a large value of R can increase the value of d, ultimately increasing the runtime complexity of the algorithm. We speculate that our invention works well if the values of R are selected from the range of [0, x], where x is a value that causes the maximum size of a neighborhood not to exceed a percentage between fifteen and twenty-five percent of the size of the entire data set (i.e., not excluding non-boundary regions). In a preferred embodiment, x is a value that causes the maximum size of a neighborhood not to exceed twenty percent of the size of the entire data set.

In addition, because one aspect of our disclosed invention is to discover relatively small critical nuggets, increasing R creates relatively larger subsets (which may or may not turn out to qualify as critical nuggets), and, because, in our view, larger subsets are less likely to qualify as critical nuggets, larger values of R (and in turn, larger values of d), can be unsuitable for use with our disclosed invention. We speculate that poor $UC_{score}$ values are obtained when neighborhood size is greater than twenty percent of the entire data set.

Our disclosed invention finds critical nuggets among neighborhoods formed around each element in the boundary set, each element forming multiple neighborhoods, each neighborhood having a different value of R (from the above-discussed range). Then, our disclosed invention calculates the $UC_{score}$ value for each neighborhood. As a result, for each value of R, the top k neighborhoods are identified based on their scores. Therefore, given r values of R, our disclosed invention first identifies k×r neighborhoods. However, because some of said k×r neighborhoods could have been formed around the same center point (but with different values of R), the scores are ranked based on unique combinations of center point and radius size. Then, the top k scores among the unique centers and their associated R value are used to identify the top k critical nuggets. In the event that two critical nuggets have the same unique center and the same $UC_{score}$ value, then the smaller critical nugget is ranked higher. Additionally, if multiple critical nuggets having the same unique center are in the top k critical nuggets, then all such critical nuggets are included, but in such an event, data records included in more than one of the top k critical nuggets are, in exemplary embodiments, only used once by the secondary classifiers discussed in Section 3.10, below (i.e., the secondary classifiers remove duplicate data records).

3.9 Duality

We speculate that a group of data records identified as critical nuggets, where said data records in said critical nuggets have a first classification, are likely to have a corresponding group of nuggets for the opposite (second) class on the other side of the boundary. In other words, we speculate that, often times (but not always), a group of nuggets for one class indicates a region of the data set of potential high interest for both classes. Decomposing data in this fashion may offer certain insights to an analyst (including, without limitation, analysts working in the strategic or tactical combat domain, the surveillance and military or national intelligence domain, or the biological or medical research domain) using the methods of our disclosed invention and may assist the analyst to better understand the phenomenon or systems related to the data. However, we also speculate that this property is domain dependent.

3.10 Improving Classification Accuracy

One property of our disclosed invention is a method of using certain aspects of our disclosed invention to improve any classification algorithm. The term "classifier" as used in the specification and claims means a classification algorithm that can learn, or be trained on, a set of training data records to create a model, which can then be used by the classification algorithm to predict, or classify, testing (novel) data records of unknown class values. We understand that the performance of a classifier is largely based on its ability to correctly classify said testing data records.

The classification improvement method of our disclosed invention can be summarized as follows. First, train two secondary classifiers to create models using the critical nuggets. If said secondary classifiers yield a consistent conclusion, then the resulting classification is known. Otherwise, either use the original classifier created from the entire training data set, or, in certain cases, determine that the result is unknown.

In a preferred embodiment the secondary classification models are created using a cost-sensitive classifier such as the MetaCost algorithm (originally described by Pedro Domingos) as implemented by the Weka machine learning library (distributed by the University of Waikato, available at http://www.cs.waikato.ac.nz/ml/weka/) (hereby incorporated by reference) and as trained using a k nearest neighbor classifier. A preferred embodiment can use the MetaCost algorithm with a 2:1, 5:1, or 10:1 ratio, but we speculate that a 5:1 ratio is preferred over a 2:1 or a 10:1 ratio. We speculate that other ratios are operable.

One unique property of this improved technique is that, as opposed to training the secondary classification models to distinguish between two classes of data from the original data set (e.g., malignant (positive) and benign (negative) tumors), the secondary classifiers are trained to distinguish between critical data records and non-critical data records. This process is performed for both classes of critical nuggets (e.g., critical-positive and critical-negative nuggets). Therefore, after this training step, our disclosed invention has calculated and at this point includes three models. The first model i.e., model $M_0$, above) is trained to distinguish between the positive and the negative class, the second model (using the secondary classifier) is trained to distinguish between positive-critical data records and data records that are not positive-critical. Finally, the third model (also using the secondary classifier) is trained to distinguish between negative-critical data records and data records that are not negative-critical.

The second and third classifiers are trained in similar fashions. The second classifier is trained using the critical nuggets of data records which are members of the positive class. Accordingly, the second classifier classifies testing data records as either being part of the critical-positive class or not being part of the critical-positive class. The third classifier is trained using the critical nuggets of data records which are members of the negative class. Accordingly, the third classifier classifies testing data records as either being part of the critical-negative class or not being part of the critical-negative class. The second and third classifiers are both trained as follows. Select a training set that includes the data records in the top k critical nuggets of a given class (i.e., positive or negative). Train the classifier with the top k critical nuggets in the respective critical class. Then, select the j nearest neighbor data records to the top k critical nuggets. This process does not consider the original class label of the j nearest neighbor data records. Train the classifier with the j nearest neighbor data records in the noncritical class. As can be understood by this explanation, the second classifier will distinguish between data records that are critical-positive and data records that are not critical-positive, and the third classifier will distinguish between data records that are critical-negative and data records that are not critical-negative.

The method of our disclosed invention first attempts to use the second classifier and the third classifier, and, under certain conditions, reverts to using the original (first) classifier. If one and only one of the second classifier or the third classifier identify the testing data record as being part of a respective critical class, then the improved algorithm of our disclosed invention classifies the testing data record as being a member of the respective class associated with said respective critical class (e.g., if the second classifier identifies said testing data record as being a member of the positive critical class, then our improved algorithm identifies said testing data record as belonging to the positive class). If both the second classifier and the third classifier identify the testing data record as being non-critical, then the first classifier is used to classify the testing data record. If both the second classifier and the third classifier identify the testing data record as being critical, then the testing data record is not classified (i.e., the classification is unknown).

DETAILED DESCRIPTION OF THE DRAWINGS

As depicted in the figures, lines connecting components may designate a direction. These directional signals are provided to assist in the understanding of the invention, and are nonlimiting.

FIG. 1 illustrates data analysis system 100, which is a computer system 105 containing a processor 110 utilizing any suitable architecture, including a microarchitecture, one such example being an Intel Core i7 brand microprocessor, a storage medium 120 such as a hard disk, CD-ROM drive and disk, removable USB storage (including, but not limited to a "flash" drive), and memory 130 has RAM or random access memory for use in the operation of computer system 105. Computer system 105 contains any suitable operating system. Computer system 105 may be a desktop computer, a rack-mountable or other server (whether suitable for a home, office, enterprise, or data center environment), or a mobile or tablet computing device such as an iPhone, iPad, Android, or Windows Mobile based computing device. Computer system 105 may also be a combination of any number of such computers connected by means of a local or wide area network (such as an Internet Protocol (IP) based network). Computing system 105 contains a computer program product comprising a storage medium 120 having a computer readable or usable program, wherein said computer readable program, when executed on a computer, causes the computer to perform functions described herein.

Exemplary embodiments of data analysis system 100 may include one or more classification systems 200 and may be implemented, for example, but not in limitation thereof, using the WEKA (Waikato Environment for Knowledge Analysis) machine learning library, the R programming language and the Python programming language.

Figure 2:
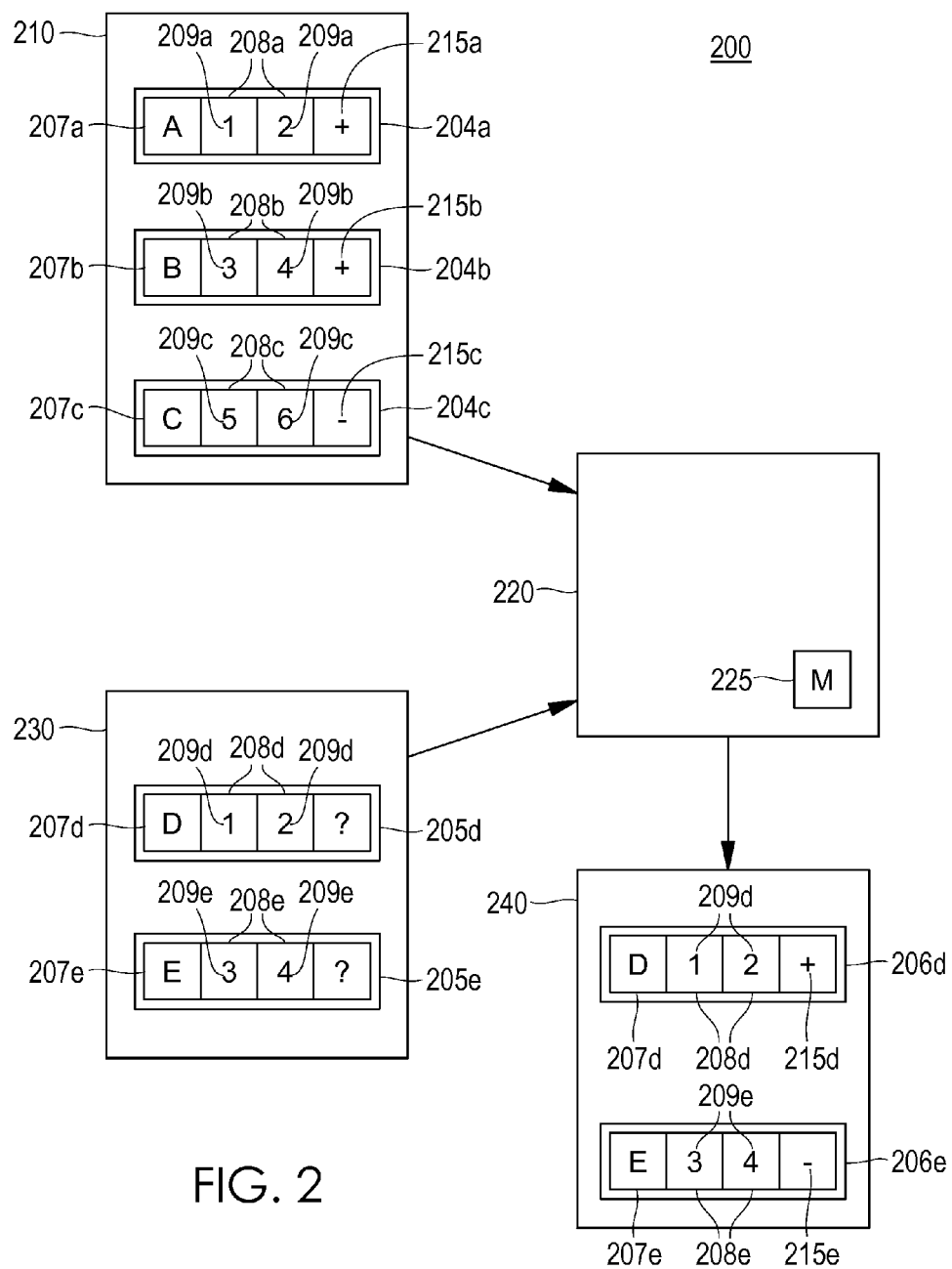
FIG. 2 is a block diagram depicting a classifier classifying data records.

FIG. 2 illustrates software programmed to implement a classification method for classifying data records using classification system 200, one or more of which may be implemented in data analysis system 100. The various data values 209 and various classifications 215 shown in FIG. 2 are simplified examples illustrated for the purpose of teaching our disclosed invention. The reference number legend is illustrated with the following example. As used herein, 204 means, collectively, 204a, 204b, and 204c; 205 means, collectively, 205d and 205e; 206 means, collectively, 206d and 206e; 207 means, collectively, 207a, 207b, 207c, 207d, and 207e; 208 means, collectively, 208a, 208b, 208c, 208d, and 208e; 209 means, collectively, 209a, 209b, 209c, 209d, and 209e; 215 means, collectively, and 215a, 215b, 215c, 215d, and 215e. Also, as used herein, a dash connecting two letters after a reference numeral means all intervening letters (e.g., 207a-e means 207a, 207b, 207c, 207d, and 207e).

Classification system 200 includes a preclassified data set 210, a classifier 220, an unclassified data set 230, and a classified data set 240. Preclassified data set 210 includes preclassified data records 204. As shown, preclassified data set 210 includes three preclassified data records 204a, 204b, and 204c, but may include any number of preclassified data records 204. We speculate that classification system 200, and, in particular, classifier 220, generally show better performance as preclassified data set 210 includes an increasingly greater number of preclassified data records 204.

Preclassified data records 204a-c, unclassified data records 205d-e, and classified data records 206d-e each include a unique identifier 207a-e, one or more attributes 208a-e, each of the attributes 208a-e associated with a respective one of data values 209a-e. Preclassified data records 204a-c and classified data records 206d-e each include one classification 215 of classifications 215a-e. As shown, preclassified data records 204a-c, unclassified data records 205d-e, and classified data records 206d-e each have a single data value 209 associated with each attribute 208. However, other configurations are operable. For example, one or more attributes 208 may be associated with no data values 209 or with multiple data values 209.

Each unique identifier 207a-e serves to permit identification of distinct preclassified data records 204a-c and permits association of unclassified data records 205d-e with classified data records 206d-e (as a non-limiting example, as shown, classified data record 206d equates to unclassified data record 205d after classification has been performed). This permits validation of the results of classifier 220.

Preclassified data records 204a-c, unclassified data records 205d-e, and classified data records 206d-e each include one or more attributes 208. Each attribute 208 generally corresponds with some type of measurement or test result and serves to label the associated data value 209 or data values 209 with each measurement. For example, "height", "weight", "cholesterol", and "blood sugar" may each be attributes 208 associated with a single data value 209. However, these examples are non-limiting, and other more complex attributes 208 may be used, such as "location," which could be associated with data values 209 representing position (i.e., x, y, and z coordinates), orientation (i.e., roll, pitch, and yaw), or possibly even GPS signals from a varying number of detectable satellites. As can be understood by one skilled in the art, each data value 209 corresponds to a data structure for storing information in a computer system. Any type of data recordable by a computer system can be stored as a data value 209, and, in particular, data stored as a data value 209 can be numerical, floating point, integer, textual, binary, encoded, encrypted, or any type of data, whatsoever.

Preclassified data records 204a-c and classified data records 206d-e each include at least one classification 215. A classification 215 generally corresponds to some way of grouping or understanding data or physical phenomena. For example, a classification 215 may correspond to the diagnosis of a disease (e.g., "positive" or "negative"), to identifying stocks likely to increase in value (e.g., "good stock" or "bad stock"), or to identifying unsolicited commercial e-mail (e.g., "spam" or "ham"). In these cases, the classification 215 stores the label applied to each preclassified data record 204a-c and classified data record 206d-e. As used herein, preclassified data records 204a-c represent data collected prior to application of the methods of our disclosed invention. This is representative of an exemplary embodiment, wherein critical neighborhoods 601 (pictured in FIG. 6 and also referred to herein as critical neighborhoods) are identified from a known data set, such as a set comprised of preclassified data records 204a-c (i.e., where the data set has a classification 215 obtained from data where results have been measured and are therefore known (e.g., whether a tumor is malignant or benign). However, this is not a limitation of the method, and the method may be applied to many types of data sets as can be understood by one skilled in the art. For example, unclassified data records 205 may be assigned experimental classifications 215 through the use of clustering techniques (including, without limitation, the j-nearest-neighbor algorithm, the k-means clustering algorithm, and other clustering techniques such as geometric clustering, syntactic clustering, and clustering via association rules). In other words our disclosed invention can find critical neighborhoods 601 given a data set that has not been classified and has no classes by finding experimental classifications 215 through said clustering techniques, applying said experimental classifications 215 to said unclassified data records 205 to change said unclassified data records 205 into preclassified data records 204, which can then be used in our disclosed invention. Additionally, as used herein, classified data records 206d-e represent novel information that is classified by a classifier such as classifier 220. Therefore, the difference between classified data records 206 and preclassified data records 204 is that the classification 215 of preclassified data records 204 is known with certainty, and the classification 215 of classified data records 206 is merely a predicted classification 215 the truth of which may not be verifiable without additional information (e.g., if a classifier 220 predicts that a tumor is benign, that email is not spam, or that a stock is going to go up in valuation, then it is impossible to verify that prediction until the true class becomes known). In addition, one skilled in the art understands that, in certain cases, preclassified data records 204 may be classified, such as by classifier 220, in order to test the performance of classifier 220 or for other reasons.

Classifier 220 is a computer program that implements machine learning and mathematical methods for identifying a sub-population to which new observations (i.e., data values 209 associated with attributes 208) belong, on the basis of a training set of data containing observations where the sub-population (classification) is known. In other words, classifier 220 learns (is trained on) a set of known (classified) data, after which time, classifier 220 can label unclassified data records 205 with a classification 215.

As preclassified data records 204 are input into classifier 220, classifier 220 learns by creating and updating model 225. Model 225 is a mathematical model implemented as computer software running in—or data structures recorded by and accessible to—classification system 200. For each preclassified data record 204 input into classifier 220, classifier 220 trains on new data values 209 and updates model 225 according to the methods of the specific learning algorithm used by classifier 220. Classifier 220 may be any type of classification method implemented or implementable as software, including, without limitation, a linear classifier, a Bayesian classifier, a perceptron, a support vector machine, a quadratic classifier, a kernel estimator, the k-nearest neighbor algorithm, a decision tree, a neural network, a Bayesian network, a hidden Markov model, a learning vector quantization, a clustering algorithm, the K-means clustering algorithm, or any algorithm that performs similar functions to these few examples. As can be appreciated by one skilled in the art, there are many such algorithms that perform the task of classifying data records, and the methods described herein are suitable for use with any classifying algorithm.

After classifier 220 learns model 225 using training data (such as preclassified data records 204), classifier 220 can be queried with unclassified data records 205. Classifier 220 then uses model 225 to predict a classification 215 for each unclassified data record 205 in order to create classified data records 206. Unique identifier 207 permits testing and verification of classifier 220.

FIG. 3 illustrates a method of identifying critical neighborhoods 601 in a data set (pictured in FIG. 6), pictured as base identification method 300 (FIG. 3). The steps of base identification method 300 are performed using specially programmed software configured to execute in data analysis system 100. First, in a receiving step 310, one or more preclassified data records 204 of preclassified data set 210 are input or otherwise loaded into data analysis system 100. Next, in training step 320, a classifier 220 is trained (according to the description of FIG. 2) with the preclassified data records 204 loaded during receiving step 310, and classifier 220 builds a model 225 accordingly.

Next, in selecting step 330, a plurality of preclassified data records 204 is selected by first selecting a first preclassified data record 204 and then selecting a group of preclassified data records 204, said group of preclassified data records 204 having a distance (calculated via any method disclosed or referenced herein) less than R units from said first preclassified data record 204 and wherein said group of preclassified data records 204 has the same classification 215 as said first preclassified data record 204. A group of preclassified data records 204 selected according to selecting step 330 is also referred to as a "neighborhood" of preclassified data records 204, and such a group selected according to selecting step 330 is also a subset of said preclassified data set 210.

As can be seen FIG. 3, analyzing sequence 325 is comprised of selecting step 330, testing step 340, and calculating step 350, and may be performed more than one time. In an exemplary embodiment, analyzing sequence 325 is repeated for each preclassified data record 204, starting with a very small value of R and increasing in small increments until the group of nearby preclassified data records 204 exceeds the size of twenty percent of the whole of said data set from which critical neighborhoods 601 are identified. In exemplary embodiments, R is incremented such that our disclosed invention uses approximately twenty (20) incrementally increasing values of R (increased at approximately equal increments) between zero and the value of R that produces the largest group not exceeding a percentage in the range of fifteen to twenty-five percent of the whole of said data set from which critical neighborhoods 601 are identified. We speculate that a preferred embodiment uses the value of R that produces the largest group not exceeding twenty percent of the whole of said data set from which critical neighborhoods 601 are identified.

Accordingly, analyzing sequence 325 is performed for multiple subsets, each time being performed with a first preclassified data record 204 as the "center" of a neighborhood of varying size.

Next, in testing step 340, each data value 209 for each attribute 208 of each preclassified data record 204 in said plurality of preclassified data records 204 is altered to create an altered (testing) copy of each preclassified data record 204 and is then classified by classifier 220 as trained in training step 320.

The texting step 340 proceeds as follows. First, a first preclassified data record 204 of said plurality of preclassified data records 204 (of the current neighborhood) is selected. Said first preclassified data record 204 is also known as the center of the neighborhood. Then, for each attribute 208, the corresponding data value 209 is altered by a delta to create a testing data record. In one embodiment, the delta is calculated as the maximum data value 209 for a given attribute 208 in the current neighborhood minus the minimum data value 209 for a given attribute 208 in the current neighborhood. The result of this process produces one testing data record containing one altered data value 209 for each attribute 208. Said testing data record is an example of an unclassified data record 205. After each testing data record is created, said testing data record is classified by classifier 220, and the resulting classification 215 is compared to the classification 215 of the current neighborhood (to reiterate, all preclassified data records 204 in the current neighborhood all have the same classification 215). The result of the comparison (each comparison a test of a testing data record) is recorded.

The process of testing step 340 is repeated for each preclassified data record 204 and for each attribute 208, and is performed twice—a first time for a delta that increases a data value 209 (i.e., for a positive delta) and a second time for a delta that decreases a data value 209 (i.e., for a negative delta). As a result, each data value 209 for each attribute 208 for each preclassified data record 204 is perturbed (altered) in the positive and the negative direction, and a comparison of the resulting classification 215 for each comparison is recorded. If the classification 215 of a testing record is different than that of the corresponding neighborhood, then the test has caused a class change. The average number of class changes that occur for a neighborhood as a result of data values 209 being altered in the positive direction (positive delta) is recorded and associated with the neighborhood (so, the total number of class changes occurring with a positive delta divided by the total number of tests performed for the current neighborhood with a positive delta). In addition, the average number of class changes that occur for a neighborhood as a result of data values 209 being altered in the negative direction (negative delta) is recorded and associated with the neighborhood (so, the total number of class changes occurring with a negative delta divided by the total number of tests performed for the current neighborhood with a negative delta). Such results are used in the calculating step 350 to calculate a criticality score for the neighborhood selected in selecting step 330.

Each delta, above, is calculated using the data values 209 associated with attributes 208 for the preclassified data records 204 in the respective neighborhood selected in the current iteration of selecting step 330. In other words, a magnitude of said delta, for each attribute 208, is related to the range of data values 209 for each attribute 208 in the current neighborhood.

Next, in calculating step 350, a criticality score is calculated for the neighborhood selected in selecting step 330. In an exemplary embodiment, the criticality score is calculated as the total number of comparisons in testing step 340 that result in a change of classification 215 divided by the total number of comparisons performed. After the criticality score is calculated, said score is recorded and associated with each selected neighborhood.

After calculating a critical score in calculating step 350, either proceed back to selecting step 330 to repeat analyzing sequence 325 or proceed to ordering step 360, in accordance with the below. Base identification method 300 repeats analyzing sequence 325 to perform selecting step 330 for each preclassified data record 204 as said first preclassified data record 204 (i.e., the center) (or, alternatively, as further described according to FIG. 5, for a selected subset of preclassified data records 204). If preclassified data records 204 remain, proceed back to selecting step 330 to select a different (not yet selected and used to form a neighborhood) preclassified data record 204. Said different preclassified data record 204 may also be referred to as a novel data record. Else, proceed to ordering step 360.

After all iterations of analyzing sequence 325 are complete, ordering step 360 begins. In ordering step 360, each selected neighborhood of preclassified data records 204 is placed into a group according to classification 215 (each neighborhood is comprised of equally-classified preclassified data records 204), and then, for each group, the neighborhoods are sorted by criticality score as calculated in calculating step 350. For each class, the neighborhoods having the highest criticality scores are then identified as critical neighborhoods 601.

FIG. 4 further illustrates an alternative identification method embodiment of our disclosed invention by illustrating an alternate method of implementing testing step 340. In particular, FIG. 4 illustrates an alternate identification method 400, a method of creating testing data records, which are unclassified data records 205, to more exhaustively explore the sensitivity to changes in data values 209 of resulting classifications 215. As is shown by FIG. 4, certain steps of the alternate identification method illustrated in FIG. 4 are the same as the steps of the base identification method illustrated in FIG. 3. Selecting step 330, testing step 340, calculating step 350, and ordering step 360 are the same when implemented in the alternate identification method as illustrated in FIG. 4. The steps of alternate identification method 400 are performed using specially programmed software configured to execute in data analysis system 100.

After the receiving step 310, training step 320, selecting step 330, and testing step 340 are performed in alternate identification method 400, this method proceeds to the thresholding step 410.

The thresholding step 410 compares average number of class changes associated with a positive delta and the average number of class changes associated with a negative delta (calculated in testing step 340) to a threshold value. If one and only one of the average number of class changes associated with a positive delta and the average number of class changes associated with a negative delta is greater than or equal to a threshold value, then the alternate identification method 400 proceeds to rotating step 420 (i.e., if the number of class changes associated with a positive delta is greater than or equal to a threshold value or if the number of class changes associated with a negative delta is greater than or equal to that same threshold value, but not if both are greater than or equal to said threshold value). Otherwise, alternate identification method 400 proceeds to calculating step 350. As is demonstrated, if this occurs, the steps performed in the alternate identification method 400 are substantially similar to those of base identification method 300.

In rotating step 420, it is assumed that each preclassified data record 204 in preclassified data set 210 contains two or more attributes 208. For each pair of two attributes 208, data values 209 associated with said two attributes 208 are used to create a plurality of testing data records (each an unclassified data record 205), each testing data record tested (classified) with results recorded.

Said plurality of testing data records are created as follows. For each first attribute 208 of said two or more attributes 208, each attribute 208 that is not said first attribute 208 is selected as a second attribute 208. For each pair of first and second attributes 208, a plurality of testing data records are created, each of said plurality of testing data records created using a different angle theta. In this fashion, theta is incremented to represent a single rotation. In an exemplary embodiment, a testing data record is created for each pair of first and second attributes 208, for theta values beginning at 10 degrees, increasing incrementally by 10 degrees until theta equals 360 degrees.

For each value of theta, a testing data record is created as follows. Beginning with an original preclassified data record 204, selected first attribute 208, selected second attribute 208, and any remaining attributes 208 (i.e., other than first attribute 208 and second attribute 208), a testing data record is creating containing all attributes 208 in original preclassified data record 204. Any remaining attributes 208 are given, in the current testing data record, the same data value 209 as in original preclassified data record 204. First selected attribute 208 is assigned a data value 209 equal to the data value 209 of first selected attribute 208 in original preclassified data record 204 plus an amount equal to a delta multiplied by the cosine of theta. Second selected attribute 208 is assigned a data value 209 equal to the data value 209 of second selected attribute 208 in original preclassified data record 204 plus an amount equal to a delta multiplied by the sine of theta. In both calculations, theta is converted appropriately to radians from degrees, if necessary. Delta is calculated similarly to the delta in testing step 340, and a testing data record is created for both a positive delta and a negative delta (whether by repetitive, sequential, parallel, or computation otherwise). This process is performed for each preclassified data record 204 in the current neighborhood.

In angular testing step 430, each testing data record created in rotating step 420 is classified by classifier 220, and each classification 215 is compared to the classification 215 of the neighborhood. Therefore, for each theta value, the average number of class changes that occur for a neighborhood as a result of data values 209 being altered in the positive direction (positive delta) is recorded as a positive average and is associated with the neighborhood (so, the total number of class changes occurring for a given theta and a positive delta divided by the total number of tests performed for the current neighborhood for a given theta and a positive delta). In addition, for each theta value, the average number of class changes that occur for a neighborhood as a result of data values 209 being altered in the negative direction (negative delta) is recorded as a negative average and is associated with the neighborhood (so, the total number of class changes occurring for a given theta and a negative delta divided by the total number of tests performed for the current neighborhood for a given theta and a negative delta). These two averages (positive and negative) are recorded and associated with the current neighborhood and the current theta value.

Next, proceed back to rotating step 420, unless all values of theta have been tested, then proceed to alternate calculating step 440 (i.e., for an exemplary embodiment, if the current value of theta is equal to 360 degrees then do not continue performing rotating step 420 and angular testing step 430 and proceed to alternate calculating step 440).

In alternate calculating step 440, each positive average and negative average (counting changes in classification), as calculated in angular testing step 430 for each value of theta, is analyzed and used to select the theta value effecting the greatest change. For each value of theta, for the current neighborhood, the positive average and the negative average are added together. The maximum sum of positive average and negative average is selected over all theta values in the current neighborhood. In other words, the classifications 215 resulting from classifier 220 classifying testing data records which are associated with the value of theta that causes the greatest change are used to calculate the criticality score for the current neighborhood. Once the theta that effects the greatest number of class changes is identified, alternate calculating step 440 proceeds according to the method of calculating step 350.

Accordingly, a criticality score is calculated for the neighborhood selected in selecting step 330. In an exemplary embodiment, the criticality score is calculated as the total number of comparisons (for the theta causing the greatest change) in angular testing step 430 that result in a change of classification 215 divided by the total number of comparisons performed (for the theta causing the greatest change). After the criticality score is calculated, said score is recorded and associated with each selected neighborhood.

After calculating a critical score in alternate calculating step 440, either proceed back to selecting step 330 or proceed to ordering step 360 in accordance with the following. Alternate identification method 400 repeats this process to perform selecting step 330 for each preclassified data record 204 as said first preclassified data record 204 (i.e., each preclassified data record 204 is used to form one or more neighborhoods; so, conceptually can be thought of as the "center," even though not necessarily the geometric center of any given neighborhood) (or, alternatively, as further described according to FIG. 5, for a selected subset of preclassified data records 204). If preclassified data records 204 remain, proceed back to selecting step 330 to select a different (not yet selected and used to form a neighborhood) preclassified data record 204. Else, proceed to ordering step 360.

After all such iterations are complete, ordering step 360 begins as part of alternate identification method 400, which is the same as ordering step 360 in base identification method 300. The results are the same—for each class (i.e., positive and negative), the neighborhoods having the highest criticality scores are then identified as critical neighborhoods 601.

Figure 5:
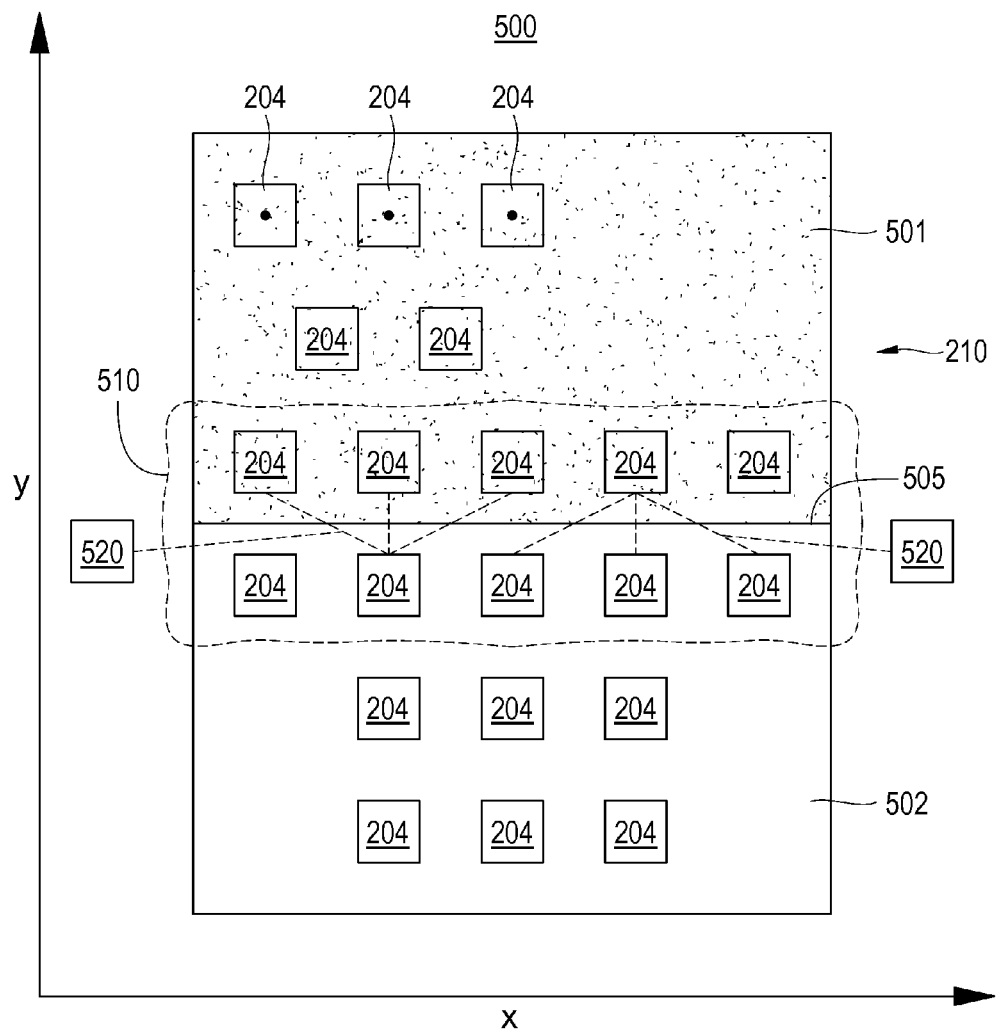
FIG. 5 is a diagram depicting a boundary set of data records in a two-class data set.

FIG. 5 illustrates boundary detection method 500. First class 501 and second class 502 are each comprised of one or more preclassified data records 204, each preclassified data record 204 belonging to either first class 501 or second class 502. Together, first class 501 and second class 502 comprise preclassified data set 210. First class 501 and said second class 502 are separated by a boundary 505. FIG. 5 also depicts boundary set 510 comprised of one or more preclassified data records 204. Unique identifiers 207, attributes 208, data values 209, and classifications 215 are not pictured in FIG. 5. Boundary detection method 500 is performed using specially programmed software configured to execute in data analysis system 100.

Using boundary detection method 500, data analysis system 100 can increase the efficiency of base identification method 300 and alternate identification method 400 by selecting fewer preclassified data records 204 in selecting step 330. However, the size of R and the corresponding size of groups selected in selecting step 330 are calculated based on the size of the entire data set, without exclusion data records which are not in boundary set 510. Boundary detection method 500 is performed as part of selecting step 330, and selects a boundary set 510 which is a subset of preclassified data records 204 that are near boundary 505. Each preclassified data record 204 in first class 501 has the same classification 215, and each preclassified data record 204 in second class 502 has the same classification 215. But, the classification 215 for each of first class 501 is different than the classification 215 for each of second class 502.

Any suitable boundary or edge detection algorithm may be used. However, in one exemplary embodiment, boundary detection method 500 selects boundary set 510 as follows. For each preclassified data record 204 in first class 501 as a current preclassified data record 204, calculate the distance (calculated via any method disclosed or referenced herein) from said current preclassified data record 204 to each preclassified data record 204 in second class 502, and identify the nearest k preclassified data records 204 in said second class 502 to said current preclassified data record 204. Then, for each nearest k preclassified data records 204 in said second class 502, calculate the average distance between each of said nearest k preclassified data records 204 and said current preclassified data record 204 and record this value as a closeness value 520. After the nearest k preclassified data records 204 in said second class 502 are found for each preclassified data record 204 in said first class 501, boundary detection method 500 identifies the k preclassified data records 204 in said first class 501 that have the k lowest closeness values 520. The same process is performed for second class 502 with respect to first class 501 to identify the preclassified data records 204 in said second class 502 having the k lowest closeness values 520. The k preclassified data records 204 in said first class 501 having the lowest closeness values 520 and the k preclassified data records 204 in said second class 502 having the lowest closeness values 520, together, comprise boundary set 510.

In the preceding paragraph, k may be determined in a number of ways. In one exemplary embodiment, k is a variable that may be determined by a human upon visualization of data in data analysis system 100 and then input into data analysis system 100 prior to the performance of our disclosed methods. In another exemplary embodiment, k may be a static constant value or may calculated by data analysis system 100 based on the characteristics of the data set. In yet another exemplary embodiment, k may be identified by first sorting the data set to be examined, and then, from lowest value increasing, examine each item. For each item examined, increment k, starting with k equaling zero. We speculate that our invention works if two consecutive values increase by more than a percentage in the range of five percent to fifteen percent, then stop, and use the current value of k. In a preferred embodiment, if two consecutive values increase by more than ten percent, then stop, and use the current value of k.

Figure 6:
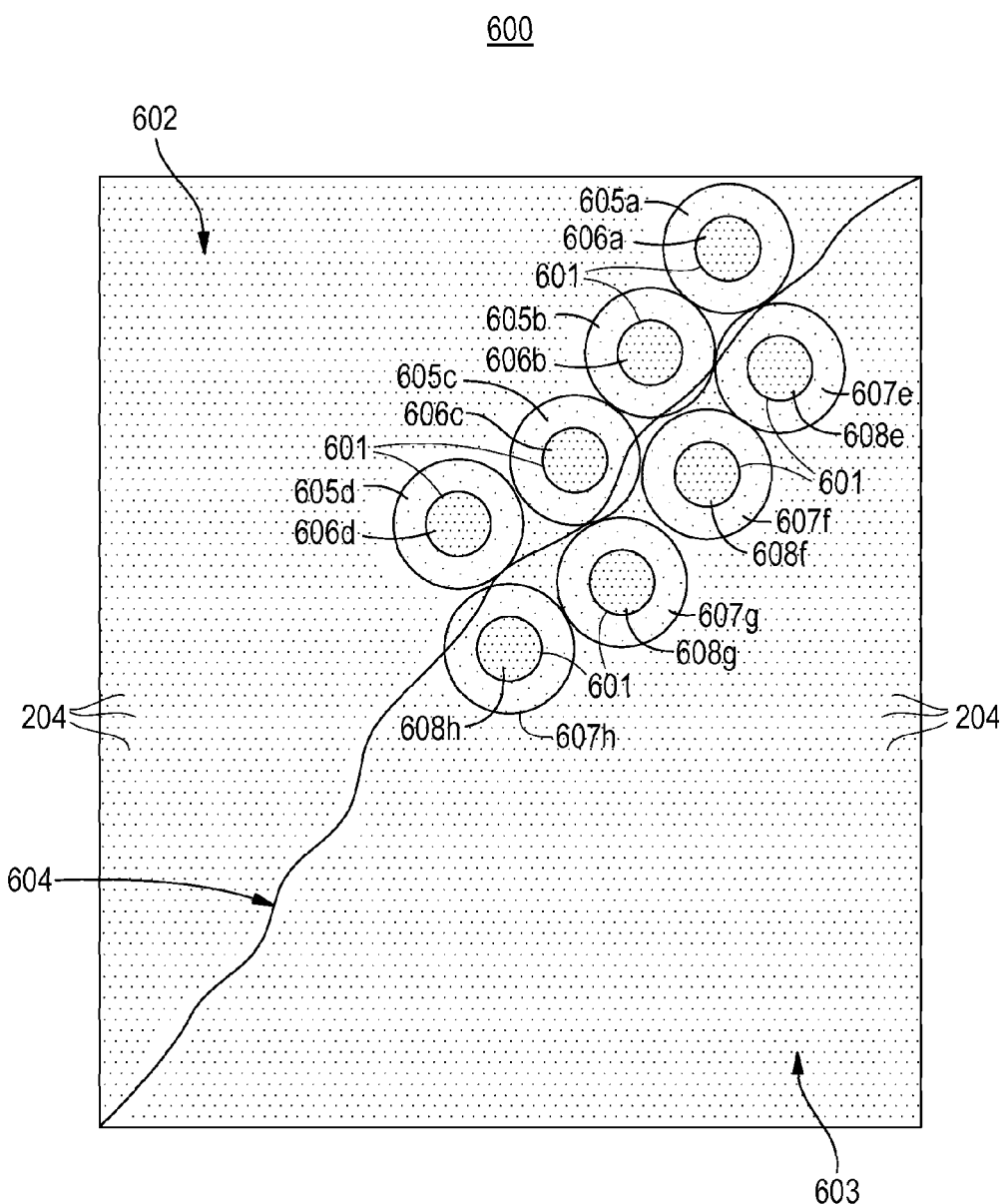
FIG. 6 is a diagram depicting critical neighborhoods.

FIG. 6 depicts an analyzed data set 600, which is an example of a preclassified data set 210 after base identification method 300 or alternate identification method 400 have been performed by data analysis system 100. Analyzed data set 600 includes preclassified data records 204 comprising a positive class 602 and a negative class 603 (together examples of a first class 501 and a second class 502), separated by a positive-negative class boundary 604 (an example of a boundary 505). FIG. 6 depicts said preclassified data records 204 after having been organized into the critical neighborhoods 601 having the highest criticality scores by ordering step 360 (in base identification method 300 or alternate identification method 400).

Positive critical neighborhoods 606a-d are each critical neighborhoods 601 in which the preclassified data records 204 comprising each positive critical neighborhood 606 belong to the same class, positive class 602 (i.e., the classification 215 of each preclassified data record 204 in positive critical neighborhoods 606a-d are all "positive"). Negative critical neighborhoods 608e-h are each critical neighborhoods 601 in which the preclassified data records 204 comprising each negative critical neighborhood 608 belong to the same class, negative class 603 (i.e., the classification 215 of each preclassified data record 204 in negative critical neighborhoods 608e-h are all "negative").

Figure 8:
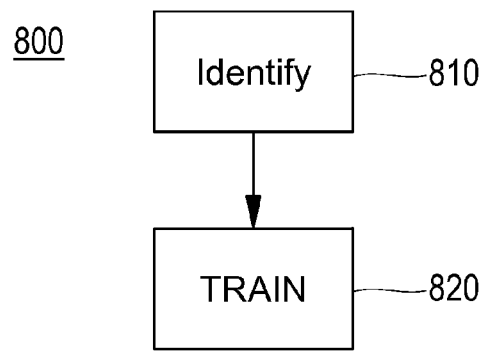
FIG. 8 is a flow chart depicting a method of training a classifier using critical neighborhoods.

Noncritical neighborhoods 605a-d are each comprised of preclassified data records 204 that are near positive critical neighborhoods 606a-d, respectively, and are identified pursuant to identification step 810 of learning method 800 (illustrated in FIG. 8). Noncritical neighborhoods 607e-h are each comprised of preclassified data records 204 that are near negative critical neighborhoods 608e-h, respectively, and are identified pursuant to identification step 810 of learning method 800 (illustrated in FIG. 8). As illustrated in FIG. 6, noncritical neighborhoods 607e-h may each contain preclassified data records 204 belonging to positive class 602 or negative class 603. Similarly, noncritical neighborhoods 605a-d may also contain preclassified data records 204 belonging to positive class 602 or negative class 603.

Figure 7:
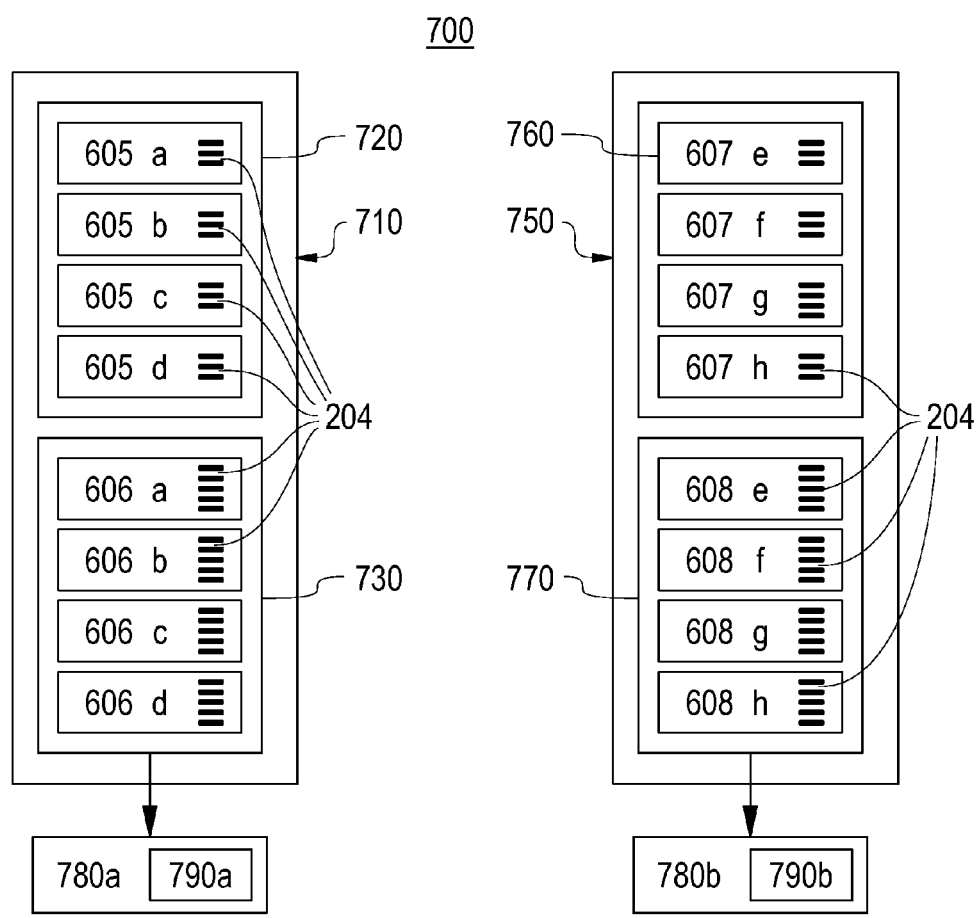
FIG. 7 is a diagram depicting training of a classifier using critical neighborhoods.

FIG. 7 illustrates learning example 700, which shows learning method 800 as applied to analyzed data set 600. FIG. 7 shows positive training sets 710 and negative training set 750 training a classifier 220 such as positive classifier 780a and negative classifier 780b using positive critical neighborhoods 606a-d and noncritical neighborhoods 605a-d to train positive classifier 780a (creating positive class model 790a) and using negative critical neighborhoods 608e-h and noncritical neighborhoods 607e-h to train negative classifier 780b (creating negative class model 790b).

As further discussed pursuant to identification step 810, the preclassified data records 204 comprising positive critical neighborhood 606 and noncritical neighborhood 605 are added to positive training set 710. Also, the preclassified data records 204 comprising negative critical neighborhood 608 and noncritical neighborhood 607 are added to negative training set 750.

Preclassified data records 204 are assigned an alternative classification 215, for use in training step 820 (see FIG. 8). Preclassified data records 204 which are in positive critical neighborhood 606 are assigned to positive critical class 720. Preclassified data records 204 which are in noncritical neighborhood 605 are assigned to noncritical class 730. Preclassified data records 204 which are in negative critical neighborhood 608 are assigned to negative critical class 760. Preclassified data records 204 which are in noncritical neighborhood 607 are assigned to noncritical class 770. Then, (in training step 820) positive classifier 780a is trained on positive training set 710 to create positive class model 790a, and negative classifier 780b is trained on negative training set 750 to create negative class model 790b.

FIG. 8 illustrates a learning method 800 for training a classifier 220 from a set of critical neighborhoods 601. Two iterations of learning method 800 are performed. One iteration is performed for the top k positive critical neighborhoods 606 using positive classifier 780a trained with positive training set 710 filled with positive critical class 720 and noncritical class 730 to create a positive class model 790a (an example of a model 225); and another iteration is performed for the top k negative critical neighborhoods 608 using negative classifier 780b trained with negative training set 750 filled with negative critical class 760 and noncritical class 770 to create a negative class model 790b (also an example of a model 225). The process is explained in further detail for an iteration using the top k positive critical neighborhoods 606 using positive classifier 780a trained with positive training set 710 filled with positive critical class 720 and noncritical class 730.

First, in identification step 810, the top k positive critical neighborhoods 606 are selected. Then, for each preclassified data record 204 for each of said selected positive critical neighborhoods 606, the m nearest neighboring preclassified data records 204 which are not in one of said selected positive critical neighborhoods 606 are selected. The m nearest neighboring preclassified data records 204 may be in positive class 602 or negative class 603. Each preclassified data record 204 for each of said selected positive critical neighborhoods 606 is added to positive training set 710 and is assigned a classification 215 of "critical positive." Accordingly, such preclassified data records 204 are in positive critical class 720. Each preclassified data record 204 of the m nearest neighboring preclassified data records 204 is added to positive training set 710 and is assigned a classification 215 of "noncritical." Accordingly, such preclassified data records 204 are in noncritical class 730. In identification step 810, m is calculated by selecting all preclassified data records 204 within a distance of double the R value used to select the current positive critical neighborhood 606 which are not a member of said current positive critical neighborhood 606.

Next, in training step 820, train positive classifier 780a with positive training set 710 to create model positive class 790a. At this point, one skilled in the art understands that positive classifier 780a is trained to distinguish between preclassified data records 204 which are "positive critical" and preclassified data records 204 which are "noncritical." Therefore, positive classifier 780a (similarly to negative classifier 780b) classifies to achieve a different result than the classifier 220 used in testing step 340 and angular testing step 430 (i.e., positive classifier 780a distinguishes between "positive critical" and "noncritical" preclassified data records 204 whereas classifier 220 used in testing step 340 and angular testing step 430 distinguishes between a "first class" (such as a "positive" class) of preclassified data records 204 and a "second class" (such as a "negative" class) of preclassified data records 204).

After training step 820 is performed for one iteration of learning method 800, learning method 800 is repeated for the top k negative critical neighborhoods 608 using negative classifier 780b trained with negative training set 750 filled with negative critical class 760 and noncritical class 770

Positive classifier 780a is the same type of classifier 220 as negative classifier 780b (i.e., positive classifier 780a and negative classifier 780b implement the same classification algorithm). However, positive classifier 780a and negative classifier 780b may be different from the classifier 220 used in training step 320. Exemplary embodiments of the classifier 220 of training step 320 use one of J48 (WEKA's implementation of the C4.5 algorithm), IBk (WEKA's implementation of k-nearest neighbor classifier, LMT (WEKA's implementation of Logistic Model Trees), and NaiveBayes; and positive classifier 780a and negative classifier 780b use WEKA's implementation of the MetaCost algoroithm with the k-nearest-neighbor classification algorithm (IBk or otherwise) as the underlying classifier. One skilled in the art will understand that any operable classification algorithm may be used.

Figure 9:
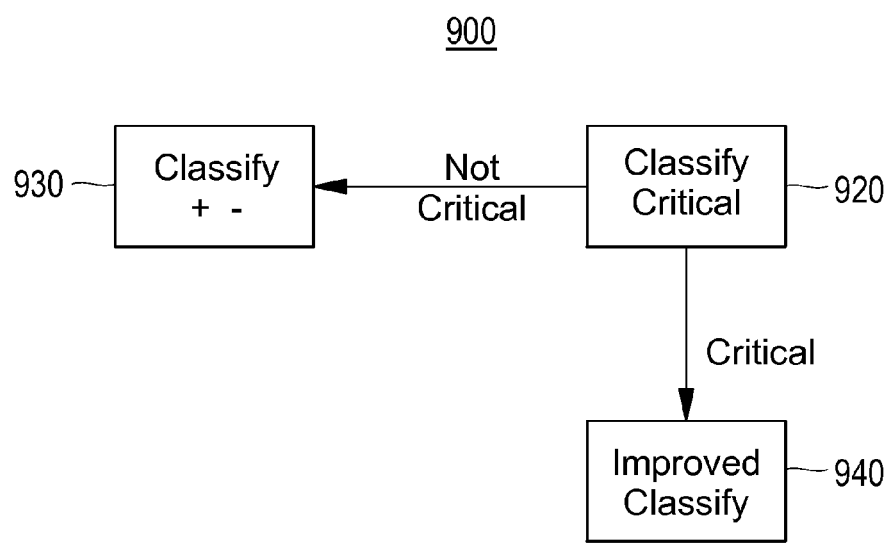
FIG. 9 is a flow chart depicting the use of additional classifiers to improve the performance of a base classifier.

FIG. 9 illustrates improved classification method 900 for classifying unclassified data records 205 using multiple classifiers 220. The steps of improved classification method 900 are performed using specially programmed software configured to execute in data analysis system 100. Improved classification method 900 is performed in conjunction with other methods disclosed herein, including learning method 800. After learning method 800 is performed, improved classification method 900 may be performed one or more times to classify one or more unclassified data records 205. However, in an exemplary embodiment, learning method 800 and either base identification method 300 or alternative identification method 400 are performed before improved classification method 900.

Improved classification method 900 operates on an unclassified data record 205 and attempts to identify the class of said unclassified data record 205, thus changing said unclassified data record 205 into a classified data record 206. In this fashion, after training is complete, improved classification method 900 operates in a similar fashion to classifier 220 (i.e., any classifier).

To classify an unclassified data record 205, improved classification method 900 first performs critical classifying step 920, where positive class model 790a and negative class model 790b are queried (via positive classifier 780a or negative classifier 780b, respectively) to classify said unclassified data record 205 with intermediate classifications 215 (i.e., a positive critical classification 215 and a negative critical classification 215). Results of improved classification method classifying data records such as unclassified data record 205 are summarized by Table 5, below.

TABLE 5

Improved Classification Method Evaluation Chart

| | Classification using positive class model | Classification using negative class model | Improved classification result |
|---|---|---|---|
| Case 1 | Noncritical Class | Noncritical Class | Use Traditional Classifier |
| Case 2 | Positive Critical Class | Noncritical Class | Positive Class |
| Case 3 | Noncritical Class | Negative Critical Class | Negative Class |
| Case 4 | Positive Critical Class | Negative Critical Class | Unknown |

As is seen in Table 5, said unclassified data record 205 may be classified in a positive critical classification 215 as being a member of positive critical class 720 or noncritical class 730 (when querying positive classifier 780a which uses positive class model 790a) and may be classified in a negative critical classification 215 as being a member of negative critical class 760 or noncritical class 770 (when querying negative classifier 780b which uses negative class model 790b).

As in Case 1 of Table 5, if positive classifier 780a classifies said unclassified data record 205 as a member of noncritical class 730 and negative classifier 780b classifies said unclassified data record 205 as a member of noncritical class 770, then improved classification method 900 proceeds to traditional classification step 930. Otherwise, improved classification method 900 proceeds to improved classification step 940.

In traditional classification step 930, the classifier 220 and model 225 used in base identification method 300 or alternative identification method 400 is used to classify said unclassified data record 205. The resulting classification 215 is assigned to said unclassified data record 205, rendering said unclassified data record 205a classified data record 206 and ending the current execution of improved classification method 900 (i.e., improved classification method 900 ends, but it may still be run for other unclassified data records 205).

In improved classification step 940, said positive critical classification 215 and said negative critical classification 215 are evaluated corresponding to Cases 2 through 4 of Table 5.

As in Case 2 of Table 5, if said evaluation indicates that said unclassified data record 205 is a member of said positive critical class 720 (according to positive class model 790a) and a member of said noncritical class 770 (according to negative class model 790b), then improved classification method 900 determines that said unclassified data record 205 is a member of positive class 602 and assigns a positive classification 215 to said unclassified data record 205, transforming said unclassified data record 205 into a classified data record 206.

As in Case 3 of Table 5, if said evaluation indicates that said unclassified data record 205 is a member of said noncritical class 730 (according to positive class model 790a) and a member of said negative critical class 760 (according to negative class model 790b), then improved classification method 900 determines that said unclassified data record 205 is a member of negative class 603 and assigns a negative classification 215 to said unclassified data record 205, transforming said unclassified data record 205 into a classified data record 206.

As in Case 4 of Table 5, if said evaluation indicates that said unclassified data record 205 is a member of said positive critical class 720 (according to positive class model 790a) and a member of said negative critical class 760 (according to negative class model 790b), then improved classification method 900 determines that said unclassified data record 205 cannot be classified with the currently available information.

Where a resulting classification 215 is assigned to said unclassified data record 205, rendering said unclassified data record 205a classified data record 206, or where it is determined that said unclassified data record 205 cannot be classified with the currently available information, current execution of improved classification method 900 ends (i.e., improved classification method 900 ends, but improved classification method 900 may be run or executed for other unclassified data records 205).

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the allowed claims and their equivalents.

Embodiments of data analysis systems 100, computer system 200, base identification method 300, alternate identification method 400, boundary detection method 500, analyzed data set 600, learning example 800, and improved classification method 900, and/or components of any thereof, can be implemented in hardware and/or software and any combination thereof as understood by one skilled in the art. Further, it will be obvious to those having skill in the art that many changes may be made to the details of the above-described embodiments without departing from the underlying principles of the invention. For example, any suitable combination of the components of data analysis systems 100, computer system 200, base identification method 300, alternate identification method 400, boundary detection method 500, analyzed data set 600, learning example 800, and improved classification method 900 is possible. The scope of the present invention should, therefore, be determined only by the following allowed claims.

What is claimed is:

1. A system comprising: one or more computers including program components executed by said one or more computers, which cause said one or more computers to perform the steps of:
   1) receiving by said one or more computers, including a memory and a processor, a plurality of classified data records, each of said classified data records containing a first classification, a first set of one or more attributes, and a first set of one or more data values, each of said attributes associated with a corresponding one or more of said data values;
   2) training a first classifier on said one or more computers using said plurality of classified data records to calculate a first model, and storing said first model on said one or more computers;
   3) selecting with said one or more computers, a first subset of data records from said plurality of classified data records, said first subset containing at least one of said plurality of classified data records;
   4) creating with said one or more computers, for each data record in said first subset, at least one corresponding testing data record;
   5) classifying using said first classifier with said one or more computers, each of said at least one testing data records to create a testing classification associated with each of said corresponding testing data records; and
   6) calculating, by said one or more computers, a score collectively representing sensitivity to change of each of said data records in said first subset, and storing said score on said one or more computers, further comprising calculating said score using the following formula:

$$score = \frac{\sum_{j=1}^{n}(w_j)}{n},$$

where: $w_j = \frac{w_j^+ + w_j^-}{2}$, $w_j^+ = \frac{d_j^+}{d}$ and $w_j^- = \frac{d_j^-}{d}$.

2. The system of claim 1, wherein in said creating step, each said corresponding testing data record contains a testing set of attributes corresponding to said first set of one or more attributes, and wherein a first selected attribute of said testing set of attributes contains a first altered value different from said data record corresponding thereto.

3. The system of claim 2, wherein in said creating step, said first altered value is altered by a delta, wherein said delta is calculated by selecting from said first subset a smallest value associated with said first selected attribute and a largest value associated with said selected attribute; and subtracting said smallest value from said largest value.

4. The system of claim 3, wherein in said creating step, a second selected attribute of said testing set of attributes contains a second altered value.

5. The system of claim 4, wherein in said creating step, said first altered value is altered by said delta multiplied by sine of an angle having an angle value, and said second altered value is altered by said delta multiplied by cosine of said angle.

6. The system of claim 5, wherein said creating step is repeated for a number of iterations, and, for each of said iterations, said angle value is different from each angle value used in other of said iterations.

7. The system of claim 6, further comprising the step of comparing said first classification of each of said plurality of classified data records with each said corresponding testing classification to create a plurality of comparisons,
   wherein said calculating step further comprises calculating said score using said plurality of comparisons.

8. The system of claim 7, further comprising the step of grouping into a plurality of groups said plurality of comparisons based on said iteration in which said comparisons were created.

9. The system of claim 8, wherein calculating step uses only one of said plurality of groups to calculate said score.

10. The system of claim 2, further comprising the step of comparing said first classification of each of said plurality of classified data records with each said corresponding testing classification to create a plurality of comparisons,
    wherein said calculating step further comprises calculating said score using said plurality of comparisons.

11. The system of claim 1, wherein said first classifier uses an algorithm selected from the group consisting of J48, IBk, LMT, and NaiveBayes.

12. The system of claim 1, wherein said calculating step further comprises the step of associating said score with said first subset, and storing said association on said one or more computers.

13. The system of claim 1, wherein said plurality of classified data records are classified, using said one or more computers, in steps preceding said receiving step, wherein said preceding steps comprise:

1) receiving by said one or more computers a plurality of unclassified data records; and
2) transforming, using said one or more computers, said plurality of unclassified data records into said plurality of classified data records using a clustering algorithm.

14. The system of claim 1, wherein said selecting, creating, classifying, and calculating steps are performed for a plurality of subsets of classified data records from said plurality of classified data records to calculate a score for each of said plurality of subsets of data records,
wherein said calculating step further comprises ordering said plurality of subsets of data records in order of said score.

15. The system of claim 14, wherein in said selecting step, each of said plurality of subsets of classified data records are selected according to the following method:
1) identifying a novel data record of said plurality of classified data records;
2) placing into a current subset of said plurality of subsets of classified data records, all data records in said plurality of classified data records which are within a distance from said novel data record.

16. The system of claim 15, wherein said selecting step is performed at least once for each classified data record in said plurality of classified data records.

17. The system of claim 15, wherein for each novel data record identified in said identifying step, said placing step is performed for multiple values of said distance.

18. The system of claim 17, wherein said placing step is performed for twenty different values of said distance.

19. The system of claim 15, wherein said selecting step is performed at least once for each classified data record in a boundary set of said plurality of classified data records.

20. The system of claim 19, wherein said boundary set is comprised of a portion of said plurality of classified data records, wherein said portion of said plurality of classified data records is selected using a calculated average distance between each classified data record and a number of said plurality of classified data records belonging to a different class than said each classified data record.

21. The system of claim 15, wherein each of said plurality of subsets of classified data records contains less than or equal to a relative number of said classified data records, wherein said number is the number of data records in said plurality of classified data records multiplied by 0.2.

22. The system of claim 14, further comprising, identifying, using each of said scores and a critical threshold, a positive group of said plurality of subsets of classified data records and a negative group of said plurality of subsets of classified data records.

23. The system of claim 22, further comprising the steps of
1) training a positive classifier to build a positive model, said positive classifier having the capacity to distinguish between members and nonmembers of said positive group of said plurality of subsets of classified data records; and
2) training a negative classifier to build a negative model, said negative classifier having the capacity to distinguish between members and nonmembers of said negative group of said plurality of subsets of classified data records.

24. The system of claim 23, wherein said positive classifier is a cost-sensitive classifier.

25. The system of claim 23, wherein said positive classifier uses a MetaCost algorithm.

26. The system of claim 23, further comprising the step of classifying an unclassified data record according to the following method:
1) receiving by said one or more computers said unclassified data record;
2) classifying, using said one or more computers, said unclassified data record by one or more of said positive classifier, said negative classifier, and said first classifier to produce a corresponding one or more intermediate classifications;
3) determining, using said one or more computers, a result using said intermediate classifications, wherein said result is either a resulting classification or an indication that said resulting classification is unknown; and
4) storing said result in association with said unclassified data record on said one or more computers.

27. The system of claim 26, wherein said receiving step further comprises receiving an unclassified data record from an input device; and
further comprising the step of transmitting said result out of said system by an output device.

28. The system of claim 26, wherein said determining step further comprises performing one or more of an improved classifying set of steps as follows:
1) if said intermediate classification of said positive classifier indicates that said unclassified data record is in said positive group of said plurality of subsets of classified data records and said intermediate classification of said negative classifier indicates that said unclassified data record is not in said negative group of said plurality of subsets of classified data records, then said result is said resulting classification and indicates that said unclassified data record is a member of a positive class of said plurality of classified data records;
2) if said intermediate classification of said positive classifier indicates that said unclassified data record is not in said positive group of said plurality of subsets of classified data records and said intermediate classification of said negative classifier indicates that said unclassified data record is in said negative group of said plurality of subsets of classified data records, then said result is said resulting classification and indicates that said unclassified data record is a member of a negative class of said plurality of classified data records;
3) if said intermediate classification of said positive classifier indicates that said unclassified data record is not in said positive group of said plurality of subsets of classified data records and said intermediate classification of said negative classifier indicates that said unclassified data record is not in of said negative group of said plurality of subsets of classified data records, then said result is said resulting classification and said resulting classification is said intermediate classification of said first classifier; and
4) if said intermediate classification of said positive classifier indicates that said unclassified data record is in said positive group of said plurality of subsets of classified data records and said intermediate classification of said negative classifier indicates that said unclassified data record is in said negative group of said plurality of subsets of classified data records, then said result is said indication that said resulting classification is unknown.

29. A system comprising: one or more computers including program components executed by said one or more computers, which cause said one or more computers to perform the steps of classifying an unclassified data record by:

1) receiving by said one or more computers, including a memory and a processor, said unclassified data record;
2) classifying, using said one or more computers, said unclassified data record by one or more of a positive classifier, a negative classifier, and a first classifier to produce a corresponding one or more intermediate classifications;
3) determining, using said one or more computers, a result using said intermediate classifications, wherein said result is either a resulting classification or an indication that said resulting classification is unknown; and
4) storing said result in association with said unclassified data record on said one or more computers;

wherein said first classifier has been trained to distinguish between members of a positive class of classified data records and members of a negative class of said classified data records, said positive classifier has been trained to distinguish between members and nonmembers of a change-sensitive subset of said positive class of classified data records, and said negative classifier has been trained to distinguish between members and nonmembers of a change-sensitive subset of said negative class of classified data records;

wherein said change-sensitive subset of said positive class of classified data records and said change-sensitive subset of said negative class of classified data records are identified by calculating a score using the following formula:

$$\text{score} = \frac{\sum_{j=1}^{n}(w_j)}{n},$$

where: $w_j = \frac{w_j^+ + w_j^-}{2}$, $w_j^+ = \frac{d_j^+}{d}$ and $w_j^- = \frac{d_j^-}{d}$.

30. The system of claim 29, wherein said determining step further comprises performing one or more of an improved classifying set of steps as follows:
1) if said intermediate classification of said positive classifier indicates that said unclassified data record is in said positive group of said plurality of subsets of classified data records and said intermediate classification of said negative classifier indicates that said unclassified data record is not in said negative group of said plurality of subsets of classified data records, then said result is said resulting classification and indicates that said unclassified data record is a member of a positive class of said plurality of subsets of classified data records;
2) if said intermediate classification of said positive classifier indicates that said unclassified data record is not in said positive group of said plurality of subsets of classified data records and said intermediate classification of said negative classifier indicates that said unclassified data record is in said negative group of said plurality of subsets of classified data records, then said result is said resulting classification and indicates that said unclassified data record is a member of a negative class of said plurality of subsets of classified data records;
3) if said intermediate classification of said positive classifier indicates that said unclassified data record is not in said positive group of said plurality of subsets of classified data records and said intermediate classification of said negative classifier indicates that said unclassified data record is not in of said negative group of said plurality of subsets of classified data records, then said result is said resulting classification and said resulting classification is said intermediate classification of said first classifier; and
4) if said intermediate classification of said positive classifier indicates that said unclassified data record is in said positive group of said plurality of subsets of classified data records and said intermediate classification of said negative classifier indicates that said unclassified data record is in said negative group of said plurality of subsets of classified data records, then said result is said indication that said resulting classification is unknown.

31. A method implemented with one or more computers comprising the steps of:
1) receiving by said one or more computers, including a memory and a processor, a plurality of classified data records, each of said classified data records containing a first classification, a first set of one or more attributes, and a first set of one or more data values, each of said attributes associated with a corresponding one or more of said data values;
2) training a first classifier on said one or more computers using said plurality of classified data records to calculate a first model, and storing said first model on said one or more computers;
3) selecting with said one or more computers, a first subset of data records from said plurality of classified data records, said first subset containing at least one of said plurality of classified data records;
4) creating with said one or more computers, for each data record in said first subset, at least one corresponding testing data record;
5) classifying using said first classifier with said one or more computers, each of said at least one testing data records to create a testing classification associated with each of said corresponding testing data records; and
6) calculating, by said one or more computers, a score collectively representing sensitivity to change of each of said data records in said first subset, and storing said score on said one or more computers, further comprising calculating said score using the following formula:

$$\text{score} = \frac{\sum_{j=1}^{n}(w_j)}{n},$$

where: $w_j = \frac{w_j^+ + w_j^-}{2}$, $w_j^+ = \frac{d_j^+}{d}$ and $w_j^- = \frac{d_j^-}{d}$.

32. The method of claim 31, wherein in said creating step, each said corresponding testing data record contains a testing set of attributes corresponding to said first set of one or more attributes, and wherein a first selected attribute of said testing set of attributes contains a first altered value different from said data record corresponding thereto.

33. The method of claim 32, wherein in said creating step, said first altered value is altered by a delta, wherein said delta is calculated by selecting from said first subset a smallest value associated with said first selected attribute and a largest value associated with said selected attribute; and subtracting said smallest value from said largest value.

34. The method of claim 33, wherein in said creating step, a second selected attribute of said testing set of attributes contains a second altered value.

35. The method of claim 34, wherein in said creating step, said first altered value is altered by said delta multiplied by sine of an angle having an angle value, and said second altered value is altered by said delta multiplied by cosine of said angle.

36. The method of claim 35, wherein said creating step is repeated for a number of iterations, and, for each of said iterations, said angle value is different from each angle value used in other of said iterations.

37. The method of claim 36, further comprising the step of comparing said first classification of each of said plurality of classified data records with each said corresponding testing classification to create a plurality of comparisons,
wherein said calculating step further comprises calculating said score using said plurality of comparisons.

38. The method of claim 37, further comprising the step of grouping into a plurality of groups said plurality of comparisons based on said iteration in which said comparisons were created.

39. The method of claim 38, wherein calculating step uses only one of said plurality of groups to calculate said score.

40. The method of claim 32, further comprising the step of comparing said first classification of each of said plurality of classified data records with each said corresponding testing classification to create a plurality of comparisons,
wherein said calculating step further comprises calculating said score using said plurality of comparisons.

41. The method of claim 31, wherein said first classifier uses an algorithm selected from the group consisting of J48, IBk, LMT, and NaiveBayes.

42. The method of claim 31, wherein said calculating step further comprises the step of associating said score with said first subset, and storing said association on said one or more computers.

43. The method of claim 31, wherein said plurality of classified data records are classified, using said one or more computers, in steps preceding said receiving step, wherein said preceding steps comprise:
1) receiving by said one or more computers a plurality of unclassified data records; and
2) transforming, using said one or more computers, said plurality of unclassified data records into said plurality of classified data records using a clustering algorithm.

44. The method of claim 31, wherein said selecting, creating, classifying, and calculating steps are performed for a plurality of subsets of classified data records from said plurality of classified data records to calculate a score for each of said plurality of subsets of data records,
wherein said calculating step further comprises ordering said plurality of subsets of data records in order of said score.

45. The method of claim 44, wherein in said selecting step, each of said plurality of subsets of classified data records are selected according to the following method:
3) identifying a novel data record of said plurality of classified data records;
4) placing into a current subset of said plurality of subsets of classified data records, all data records in said plurality of classified data records which are within a distance from said novel data record.

46. The method of claim 45, wherein said selecting step is performed at least once for each classified data record in said plurality of classified data records.

47. The method of claim 45, wherein for each novel data record identified in said identifying step, said placing step is performed for multiple values of said distance.

48. The method of claim 47, wherein said placing step is performed for twenty different values of said distance.

49. The method of claim 45, wherein said selecting step is performed at least once for each classified data record in a boundary set of said plurality of classified data records.

50. The method of claim 49, wherein said boundary set is comprised of a portion of said plurality of classified data records, wherein said portion of said plurality of classified data records is selected using a calculated average distance between each classified data record and a number of said plurality of classified data records belonging to a different class than said each classified data record.

51. The method of claim 45, wherein each of said plurality of subsets of classified data records contains less than or equal to a relative number of said classified data records, wherein said number is the number of data records in said plurality of classified data records multiplied by 0.2.

52. The method of claim 44, further comprising, identifying, using each of said scores and a critical threshold, a positive group of said plurality of subsets of classified data records and a negative group of said plurality of subsets of classified data records.

53. The method of claim 52, further comprising the steps of
1) training a positive classifier to build a positive model, said positive classifier having the capacity to distinguish between members and nonmembers of said positive group of said plurality of subsets of classified data records; and
2) training a negative classifier to build a negative model, said negative classifier having the capacity to distinguish between members and nonmembers of said negative group of said plurality of subsets of classified data records.

54. The method of claim 53, wherein said positive classifier is a cost-sensitive classifier.

55. The method of claim 53, wherein said positive classifier uses a MetaCost algorithm.

56. The method of claim 53, further comprising the step of classifying an unclassified data record according to the following method:
1) receiving by said one or more computers said unclassified data record;
2) classifying, using said one or more computers, said unclassified data record by one or more of said positive classifier, said negative classifier, and said first classifier to produce a corresponding one or more intermediate classifications;
3) determining, using said one or more computers, a result using said intermediate classifications, wherein said result is either a resulting classification or an indication that said resulting classification is unknown; and
4) storing said result in association with said unclassified data record on said one or more computers.

57. The method of claim 56, wherein said receiving step further comprises receiving an unclassified data record from an input device; and
further comprising the step of transmitting said result by an output device.

58. The method of claim 56, wherein said determining step further comprises performing one or more of an improved classifying set of steps as follows:
1) if said intermediate classification of said positive classifier indicates that said unclassified data record is in said positive group of said plurality of subsets of classified data records and said intermediate classification of said negative classifier indicates that said unclassified data record is not in said negative group of said plurality of subsets of classified data records, then said result is said resulting classification and indicates that said unclassified data record is a member of a positive class of said plurality of classified data records;
2) if said intermediate classification of said positive classifier indicates that said unclassified data record is not in said positive group of said plurality of subsets of classified data records and said intermediate classification of said negative classifier indicates that said unclassified data record is in said negative group of said plurality of subsets of classified data records, then said result is said resulting classification and indicates that said unclassified data record is a member of a negative class of said plurality of classified data records;
3) if said intermediate classification of said positive classifier indicates that said unclassified data record is not in said positive group of said plurality of subsets of classified data records and said intermediate classification of said negative classifier indicates that said unclassified data record is not in of said negative group of said plurality of subsets of classified data records, then said result is said resulting classification and said resulting classification is said intermediate classification of said first classifier; and
4) if said intermediate classification of said positive classifier indicates that said unclassified data record is in said positive group of said plurality of subsets of classified data records and said intermediate classification of said negative classifier indicates that said unclassified data record is in said negative group of said plurality of subsets of classified data records, then said result is said indication that said resulting classification is unknown.

59. A method implemented with one or more computers comprising the steps of classifying an unclassified data record by:
1) receiving by said one or more computers, including a memory and a processor, said unclassified data record;
2) classifying, using said one or more computers, said unclassified data record by one or more of a positive classifier, a negative classifier, and a first classifier to produce a corresponding one or more intermediate classifications;
3) determining, using said one or more computers, a result using said intermediate classifications, wherein said result is either a resulting classification or an indication that said resulting classification is unknown; and
4) storing said result in association with said unclassified data record on said one or more computers;
wherein said first classifier has been trained to distinguish between members of a positive class of classified data records and members of a negative class of said classified data records, said positive classifier has been trained to distinguish between members and nonmembers of a change-sensitive subset of said positive class of classified data records, and said negative classifier has been trained to distinguish between members and nonmembers of a change-sensitive subset of said negative class of classified data records;
wherein said change-sensitive subset of said positive class of classified data records and said change-sensitive subset of said negative class of classified data records are identified by calculating a score using the following formula:

$$\text{score} = \frac{\sum_{j=1}^{n}(w_j)}{n},$$

$$\text{where: } w_j = \frac{w_j^+ + w_j^-}{2}, \ w_j^+ = \frac{d_j^+}{d} \text{ and } w_j^- = \frac{d_j^-}{d}.$$

60. The method of claim 59, wherein said determining step further comprises performing one or more of an improved classifying set of steps as follows:
1) if said intermediate classification of said positive classifier indicates that said unclassified data record is in said positive group of said plurality of subsets of classified data records and said intermediate classification of said negative classifier indicates that said unclassified data record is not in said negative group of said plurality of subsets of classified data records, then said result is said resulting classification and indicates that said unclassified data record is a member of a positive class of said plurality of classified data records;
2) if said intermediate classification of said positive classifier indicates that said unclassified data record is not in said positive group of said plurality of subsets of classified data records and said intermediate classification of said negative classifier indicates that said unclassified data record is in said negative group of said plurality of subsets of classified data records, then said result is said resulting classification and indicates that said unclassified data record is a member of a negative class of said plurality of classified data records;
3) if said intermediate classification of said positive classifier indicates that said unclassified data record is not in said positive group of said plurality of subsets of classified data records and said intermediate classification of said negative classifier indicates that said unclassified data record is not in of said negative group of said plurality of subsets of classified data records, then said result is said resulting classification and said resulting classification is said intermediate classification of said first classifier; and
4) if said intermediate classification of said positive classifier indicates that said unclassified data record is in said positive group of said plurality of subsets of classified data records and said intermediate classification of said negative classifier indicates that said unclassified data record is in said negative group of said plurality of subsets of classified data records, then said result is said indication that said resulting classification is unknown.

* * * * *